(12) United States Patent
Ghosh et al.

(10) Patent No.: US 11,544,676 B2
(45) Date of Patent: Jan. 3, 2023

(54) EQUIPMENT REPAIR MANAGEMENT AND EXECUTION

(71) Applicant: HITACHI, LTD., Tokyo (JP)

(72) Inventors: Dipanjan Ghosh, Santa Clara, CA (US); Ahmed Khairy Farahat, Santa Clara, CA (US); Chi Zhang, San Jose, CA (US); Marcos Vieira, San Francisco, CA (US); Chetan Gupta, San Mateo, CA (US)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/729,657

(22) Filed: Dec. 30, 2019

(65) Prior Publication Data

US 2020/0134574 A1 Apr. 30, 2020

Related U.S. Application Data

(63) Continuation of application No. 16/139,149, filed on Sep. 24, 2018.

(51) Int. Cl.
*G06Q 10/00* (2012.01)
*G06N 3/08* (2006.01)

(52) U.S. Cl.
CPC .............. *G06Q 10/20* (2013.01); *G06N 3/08* (2013.01)

(58) Field of Classification Search
None
See application file for complete search history.

(56) References Cited

U.S. PATENT DOCUMENTS

| | | |
|---|---|---|
| 5,729,452 A | 3/1998 | Smith et al. |
| 6,298,305 B1 | 10/2001 | Kadaba et al. |
| 9,672,497 B1 | 6/2017 | Lewis et al. |
| 2008/0254746 A1 | 10/2008 | Krishnan et al. |
| 2011/0119062 A1 | 5/2011 | Dohan |

(Continued)

FOREIGN PATENT DOCUMENTS

| | | |
|---|---|---|
| JP | 2018-22372 A | 2/2018 |
| JP | 2018-116502 A | 7/2018 |

(Continued)

OTHER PUBLICATIONS

Butte et al., "Machine Learning Based Predictive Maintenance Strategy: a Super Learning Approach with Deep Neural Networks," 2018 IEEE Workshop on Microelectronics and Electron Devices (WMED), 2018, pp. 1-5, doi: 10.1109/WMED.2018.8360836 (Year: 2018).*

(Continued)

*Primary Examiner* — Jan P Mincarelli
(74) *Attorney, Agent, or Firm* — Mattingly & Malur, PC

(57) ABSTRACT

In some examples, a computer system may receive historical repair data and may extract features from the historical repair data for use as training data. The computer system may determine, from the historical repair data, a repair hierarchy including a plurality of repair levels which includes repair actions as one of the repair levels. Furthermore, the computer system may train the machine learning model, which performs multiple tasks for predicting values of individual levels of the repair hierarchy, by tuning parameters of the machine learning model using the training data.

20 Claims, 18 Drawing Sheets

(56) References Cited

U.S. PATENT DOCUMENTS

| | | | | |
|---|---|---|---|---|
| 2013/0198556 A1* | 8/2013 | Kolbet | ............... | G06Q 10/20 |
| | | | | 714/2 |
| 2016/0035150 A1 | 2/2016 | Barfield, Jr. et al. | | |
| 2016/0342681 A1 | 11/2016 | Kesin | | |
| 2017/0169400 A1* | 6/2017 | Diwinsky | ............... | G06F 16/51 |
| 2017/0293894 A1* | 10/2017 | Taliwal | ............... | G06K 9/00671 |
| 2019/0156298 A1* | 5/2019 | Ethington | ............... | G06N 7/005 |
| 2019/0294631 A1* | 9/2019 | Alcantara | ......... | G06F 16/90332 |

FOREIGN PATENT DOCUMENTS

| | | | | |
|---|---|---|---|---|
| WO | 2018/122928 A1 | 7/2018 | | |
| WO | WO-2019002851 A1 * | 1/2019 | ............... | G01D 4/00 |

OTHER PUBLICATIONS

William Chan, et al., Listen, Attend and spell: A neural network for large vocabulary conversational speech recognition, IEEE 2016, p. 4960-4964.

Alex Graves, et al., Speech Recognition with deep recurrent neural networks, Department of Computer Science, University of Toronto, Mar. 2013.

Sutskever, et al., "Sequence to Sequence Learning with Neural Networks", NIPS'14 Proceedings of the 27th International Conference on Neural Information Processing Systems, vol. 2, pp. 3104-3112, Montreal, Canada, Dec. 8-13, 2014.

International Search Report of PCT/US2017/055461 dated Jan. 5, 2018.

PCT Application PCT/US2017/055461 filed Oct. 6, 2017.

Japanese Office Action received in corresponding Japanese Application No. 2019-118477 dated May 19, 2020.

Extended European Search Report received in corresponding European Application No. 19176365.5 dated Jul. 17, 2019.

* cited by examiner

EQUIPMENT REPAIR MANAGEMENT AND EXECUTION

BACKGROUND

When complex equipment experiences a failure, it may be difficult and time-consuming to determine the cause of the failure and a corresponding repair action for returning the equipment to a functioning condition. Furthermore, with aging technicians leaving the workforce in some industries, there may be a knowledge gap created in which newer technicians may not have sufficient experience to easily determine a cause of a failure and a suitable repair procedure for correcting the failure.

SUMMARY

Implementations herein include arrangements and techniques for training and using a machine learning model to determine repair actions. In some examples, a computer system may receive historical repair data for first equipment, and may extract features from the historical repair data for the first equipment as training data including one or more of: free-text variables associated with comments related to the first equipment; usage attributes associated with the first equipment; equipment attributes associated with the first equipment; sensor data associated with the first equipment; or event data associated with the first equipment. The system may determine a repair hierarchy including a plurality of repair levels for the equipment. The system may use the training data to train a machine learning model as a multi-layer model trained to perform multiple tasks for predicting individual levels of the repair hierarchy. The system may receive a repair request associated with second equipment and uses the machine learning model to determine at least one repair action based on the received repair request.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
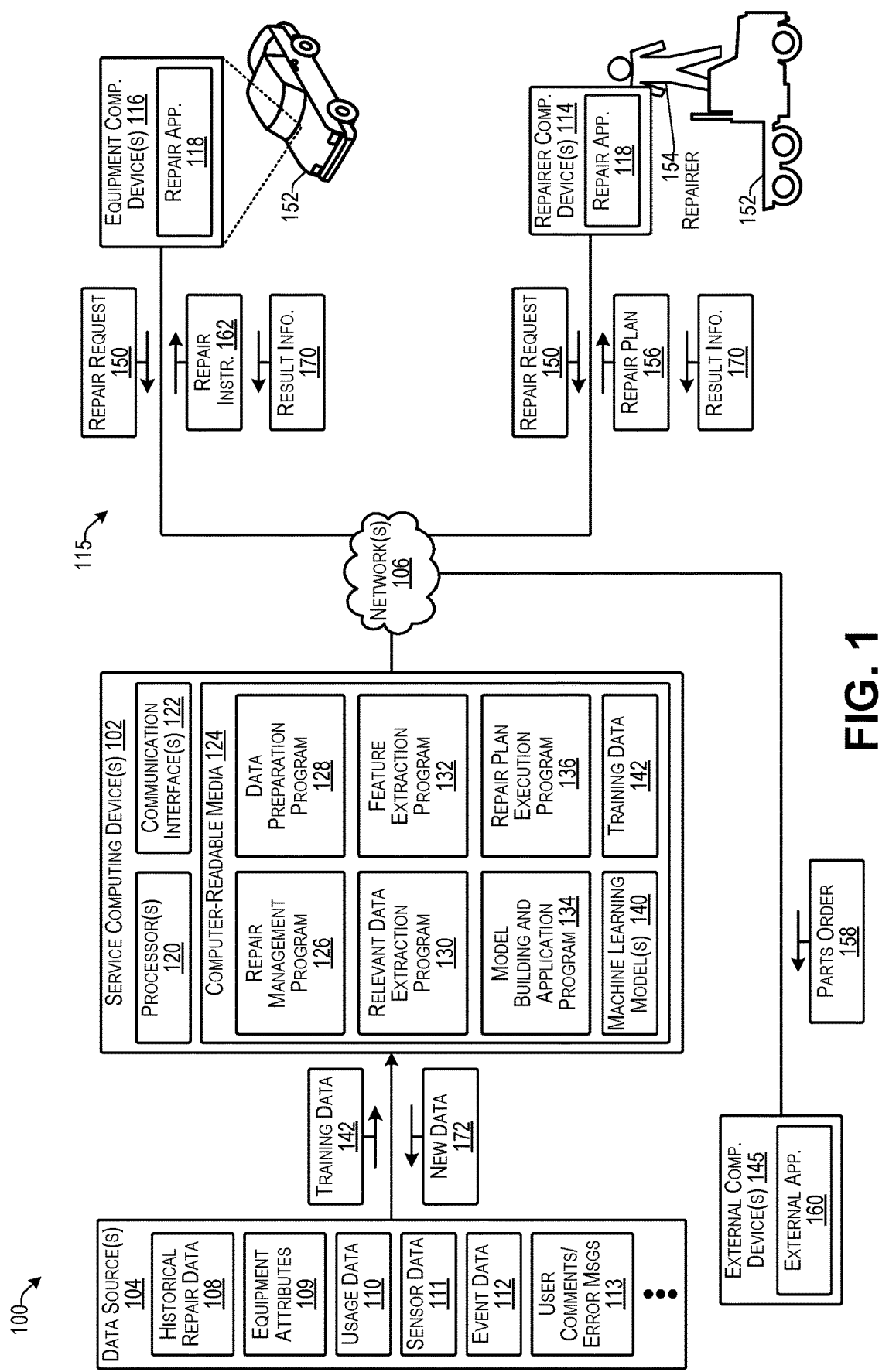
FIG. 1 illustrates an example architecture of a computer system able to determine and implement repairs according to some implementations.

Some implementations herein are directed to techniques and arrangements for a system that determines one or more repair actions, such as in response to receiving a repair request following an equipment failure. Examples of equipment failures herein may include breakdown events, such as when the equipment cannot be operated, as well as soft failures, such as partial operation, inefficient operation, or otherwise abnormal operation of the equipment or one of its components. The system herein may provide a data-driven system that is able to provide instructions to maintenance personnel for implementing a repair and/or provide instructions to the equipment to implement repairs on the equipment directly. In some cases, the system may use analytics technology to determine a repair plan when the equipment is brought in for repair, which may include using a model trained using historical repair data.

As one example, the system may receive as input: (1) data about the equipment and the working environment of the equipment, and (2) natural language complaints or other comments from a user of the equipment regarding the failure in need of repair. The system may model multi-modal data that includes high-dimensional sparse and dense data components. Some examples include a training mechanism for consistent structured output prediction, and may further include a mechanism to focus on key aspects of the equipment environment based on received natural language comments and other equipment data. Using these mechanisms and techniques, the system may determine how to recommend a course of repair actions from historical repair records and data associated with these repairs. In some examples, a repair plan may be sent as instructions to the location of the equipment, such as to a repairer computing device or to the equipment itself. In other examples, the system itself may execute the repair plan, such as by remotely initiating a repair procedure at the equipment, ordering one or more parts for the repair, assigning labor for executing the repair, scheduling a time for the repair to be performed, or the like. Accordingly, the system herein may implement repairs, reduce the amount of time that equipment is out of service, increase the efficiency of the repair process, and reduce the likelihood of repair mistakes.

In some examples, a computer system may receive input data for the equipment. The system may identify and extract free-form text in the input data, such as words, phrases, topics, or other free-form text. The system may also extract a plurality of other features from the input data. Examples of the plurality of other features may include equipment attributes, usage data, sensor data, structured text, event data, and the like. The system may train at least one machine learning model using the extracted features. The system may receive a repair request associated with the equipment and may use the at least one trained machine learning model to determine at least one repair action based on the received repair request.

The users of the system herein may include, but are not limited to, equipment end-users and/or operators; repair and maintenance personnel and management; and decision makers and operation managers. The system herein may be used as a standalone solution or may be integrated with other existing systems that provide other functionalities for maintenance management and maintenance optimization and performance.

For discussion purposes, some example implementations are described in the environment of a computer system that determines repair actions and repair plans for equipment. However, implementations herein are not limited to the particular examples provided, and may be extended to other types of equipment, other environments of use, other system architectures, other applications, and so forth, as will be apparent to those of skill in the art in light of the disclosure herein.

FIG. 1 illustrates an example architecture of a computer system 100 able to determine and implement repairs according to some implementations. The system 100 includes at least one service computing device 102 that is able to communicate directly or indirectly with one or more data sources 104. For example, each data source 104 may be a storage directly connected to the service computing device 102, may be a storage connected through one or more networks 106, may include another computing device (not shown in FIG. 1) that maintains databases or other data structures of data used by the service computing device(s) 102, such as through a network connection or direct connection, may be a cloud storage location, or other network or local storage location that the service computing device 102 accesses to retrieve the stored data, may be any combination of the foregoing, or any of various other configurations, as will be apparent to those of skill in the art having the benefit of the disclosure herein. Accordingly, implementations herein are not limited to any particular storage apparatus or technique for storing the data or portions thereof in the data sources 104.

The data source(s) 104 may receive, store, provide, or otherwise maintain data used by the service computing device(s) 102. Examples of data included in the data source(s) 104 include historical repair data 108, equipment attributes 109, usage data 110, sensor data 111, event data 112, and user comments and/or error messages 113. The historical repair data 108 may include data regarding maintenance and other repairs made to the equipment in the past. The historical repair data 108 may include repair data for all equipment types and repair types.

The equipment attributes 109 may include structured data that encode the attributes of the equipment subject to repair. Examples include, but are not limited to, the make and model of the equipment, the manufacturing year, the capacity and ratings of the equipment and its components. For instance, for the same symptoms, different types of equipment might require different repair actions. Therefore, the equipment attributes 109 may be used by the model building process to determine the correct repair for each equipment type given the symptoms of the problem. This equipment attributes 109 may be treated as categorical variables, and may be high-dimensional and sparse.

In addition, the usage data 110 may include structured data related to the usage of the equipment since the start of operation of the equipment, e.g., from when the equipment was first put into service. Examples include age, operating hours, mileage, payloads, and so forth. Usage data may be useful for determining the appropriate repair actions given the symptoms of the problem to be fixed. In some examples, the usage data 110 may be treated as continuous variables, and may be a high-dimensional and dense representation.

Furthermore, the sensor data 111 may include time series data collected from one or more sensors, such as before the equipment failed and/or was sent for repair. Each time series may represent the readings of the sensor over time, such as a sample of a signal from the sensor. Each sensor data reading may be associated with a timestamp that specifies the date and time of the reading of the sensor signal. The sensor data 111 may be treated as continuous variables, and may be high-dimensional and a dense representation.

Additionally, the event data 112 may include information about events collected from the equipment, such as before the equipment failed and/or was sent for repair. The events included in the event data 112 may include different types of events, such as maintenance actions, alarms, notifications, or the like. Each of the events included in the event data 112 may be associated with a timestamp that specifies the date and time of the event occurrence; however, in other examples, a timestamp might not be included. Accordingly, the system herein may consider event information with and without timestamps (e.g., sequential dependencies). The event data 112 may be high-dimensional and sparse representations.

The user comments and/or error messages 113 may include natural language complaints or other comments from the equipment user as well as any error messages issued by the equipment or other systems in the environment of the equipment. These unstructured or semi-structured data may describe the symptoms of the problem to be fixed (e.g., "loud noise from the back of the equipment", "equipment overheating", etc.). User comments may be received before or during the repair process, and may be received in a variety of different formats including but not limited to typed text, handwritten text, voice notes, voicemail, and the like. The user comments and/or error messages 113 may be high-dimensional and sparse.

The service computing device 102 may further communicate over the one or more networks 106 with one or more client computing devices 115, such as one or more repairer computing devices 114 and/or one or more equipment computing devices 116, each of which may include a repair application 118. In some examples, the repair application 118 on each of the repairer computing device(s) 114 and/or the equipment computing device 116 may include the same application features and functionality, while in other examples, the repair application 118 may be customized for individual repair environments in which it is to be used.

In some implementations, the service computing device 102 may include one or more servers, personal computers, embedded processors, or other types of computing devices that may be embodied in any number of ways. For instance, in the case of a server, the programs, other functional components, and at least a portion of data storage may be implemented on at least one server, such as in a cluster of servers, a server farm or data center, a cloud-hosted computing service, and so forth, although other computer architectures may additionally or alternatively be used.

In the illustrated example, the service computing device 102 includes, or otherwise may have associated therewith, one or more processors 120, one or more communication interfaces 122, and one or more computer-readable media 124. Each processor 120 may be a single processing unit or a number of processing units, and may include single or multiple computing units, or multiple processing cores. The processor(s) 120 may be implemented as one or more central processing units, microprocessors, microcomputers, microcontrollers, digital signal processors, state machines, logic circuitries, and/or any devices that manipulate signals based on operational instructions. For instance, the processor(s) 120 may be one or more hardware processors and/or logic circuits of any suitable type specifically programmed or configured to execute the algorithms and processes described herein. The processor(s) 120 may be configured to fetch and execute computer-readable instructions stored in the computer-readable media 124, which can program the processor(s) 120 to perform the functions described herein.

The computer-readable media 124 may include volatile and nonvolatile memory and/or removable and non-removable media implemented in any type of technology for storage of information such as computer-readable instructions, data structures, program modules, or other data. For example, the computer-readable media 124 may include, but is not limited to, RAM, ROM, EEPROM, flash memory or other memory technology, optical storage, solid state storage, magnetic tape, magnetic disk storage, RAID storage systems, object storage systems, storage arrays, network attached storage, storage area networks, cloud storage, or any other medium that can be used to store the desired information and that can be accessed by a computing device. Depending on the configuration of the service computing device 102, the computer-readable media 124 may be a tangible non-transitory medium to the extent that, when mentioned, non-transitory computer-readable media exclude media such as energy, carrier signals, electromagnetic waves, and/or signals per se. In some cases, the computer-readable media 124 may be at the same location as the service computing device 102, while in other examples, the computer-readable media 124 may be partially remote from the service computing device 102.

The computer-readable media 124 may be used to store any number of functional components that are executable by the processor(s) 120. In many implementations, these functional components comprise executable instructions and/or programs that are executable by the processor(s) 120 and that, when executed, specifically program the processor(s) 120 to perform the actions attributed herein to the service computing device 102. Functional components stored in the computer-readable media 124 may include a repair management program 126. The repair management program 126 may include one or more computer programs, computer-readable instructions, executable code, or portions thereof that are executable to cause the processor(s) 120 to perform various tasks as described herein. In the illustrated example, the repair management program 126 may include or may access a data preparation program 128, a relevant data extraction program 130, a feature extraction program 132, a model building and application program 134, and a repair plan execution program 136.

Each of these functional components 128-136 may be an executable module of the repair management program 126, or a portion thereof. Alternatively, in other examples, some or all of these functional components 128-136 may be separately executable stand-alone computer programs that may be invoked by the repair management program 126.

The data preparation program 128 may configure the one or more processors 120 to prepare received input data by removing noise and transforming different data types and/or sources to a format that can be useful for further analysis. The relevant data extraction program 130 may configure the one or more processors to extract, for each repair incident (historical or new), one or more subsets of data that contain symptoms of the problem that needs to be repaired. The feature extraction program 132 may configure the one or more processors to extract features from the relevant data associated with the equipment subject to repair. The model building and application program 134 may configure the one or more processors to build one or more machine learning models used for repair determination from the historical repair data, and may subsequently apply the one or more machine learning models to new repair incidents. Furthermore, the repair plan execution program 136 may configure the one or more processors to determine and execute one or more repair plans, such as for executing a repair plan, sending repair instructions to a repairer computing device, sending repair instructions to an equipment computing device, or the like.

Additionally, the functional components in the computer-readable media 124 may include an operating system (not shown in FIG. 1) that may control and manage various functions of the service computing device 102. In some cases, the functional components may be stored in a storage portion of the computer-readable media 124, loaded into a local memory portion of the computer-readable media 124, and executed by the one or more processors 120. Numerous other software and/or hardware configurations will be apparent to those of skill in the art having the benefit of the disclosure herein.

In addition, the computer-readable media 124 may store data and data structures used for performing the functions and services described herein. For example, the computer-readable media 124 may store one or more machine learning models 140, and may store, at least temporarily, training data 142 used for training the machine learning models 140, as well as reports, client data, repair requests, and other information received from the client computing devices 115. In some examples, the computer readable media 124 may encompass the data source(s) 104, while in other examples, the computer readable media 124 may be separate from the data source(s) 104.

The one or more machine learning models 140 may be used by one or more of the functional components, such as the model building and application program 134 for determining one or more repair solutions in response to information received from one or more of the client computing devices 115. Examples of the machine learning model(s) 140 may include deep learning models, such as deep neural networks and recurrent neural networks. For example, a deep neural network is a type of artificial neural network with multiple layers between the input and output layers. The deep neural network finds the correct mathematical manipulation to turn the input into the output, regardless of whether based on a linear relationship or a non-linear relationship. The deep neural network passes through the layers to determine a probability for each output. Each mathematical manipulation as such is considered a layer. In some examples herein, the deep neural network may have many layers and is able to model complex non-linear relationships.

Furthermore, while a deep learning model is used in some examples herein, additional examples of other types of machine learning models 140 that may be used in some examples herein may include predictive models, decision trees, regression models, such as linear regression models, stochastic models, such as Markov models and hidden Markov models, and so forth. Accordingly, some implementations herein are not limited to a particular type of machine learning model.

The service computing device(s) 102 may also include or maintain other functional components and data, which may include programs, drivers, etc., and the data used or generated by the functional components. Further, the service computing device(s) 102 may include many other logical, programmatic, and physical components, of which those described above are merely examples that are related to the discussion herein.

The communication interface(s) 122 may include one or more interfaces and hardware components for enabling communication with various other devices, such as over the one or more networks 106. Thus, the communication interfaces 122 may include, or may couple to, one or more ports that provide connection to the network(s) 106 for communicating with the data sources 104, the client computing device(s) 115, and/or one or more external computing devices 145. For example, the communication interface(s) 122 may enable communication through one or more of a LAN (local area network), WAN (wide area network), the Internet, cable networks, cellular networks, wireless networks (e.g., Wi-Fi) and wired networks (e.g., fiber optic, Ethernet, Fibre Channel), direct connections, as well as short-range wireless communications, such as BLUETOOTH®, and the like, as additionally enumerated below.

Further, the client computing devices 115 and the one or more external computing devices 145 may include configurations and hardware similar to those discussed above, but with different functional components, such as the repair application 118, and different data. The client computing devices 115 may be any type of computing device able to communicate over a network including server computing devices, desktop computing devices, laptop computing devices, tablet computing devices, smart phone computing devices, wearable computing devices, embedded computing devices, such as electronic control units, and so forth.

The one or more networks 106 may include any type of network, including a LAN, such as an intranet; a WAN, such as the Internet; a wireless network, such as a cellular network; a local wireless network, such as Wi-Fi; short-range wireless communications, such as BLUETOOTH®; a wired network including fiber optics, Ethernet, Fibre Channel, or any other such network, a direct wired connection, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the service computing device(s) 102, the client computing device(s) 115, the external computing devices 145, and in some examples, the data sources 104, are able to communicate over the one or more networks 106 using wired or wireless connections, and combinations thereof.

In some implementations, the service computing device 102 may receive the training data 142 from the one or more data sources 104, such as by streaming or download. For instance, the model building and application program 134 may obtain the training data 142 from the historical repair data 108 and may provide the training data to the data preparation program 128, the relevant data extraction program 130, and the feature extraction program 132, as discussed additionally below. The model building and application program 134 may use the training data 142 to train the one or more machine learning models 140.

Subsequent to the training of the one or more machine learning models 140, the repair management program 126 may receive a repair request 150 from one of the client computing devices 115 requesting repair for a corresponding equipment 152. Examples of equipment 152 herein may include vehicles, appliances, construction equipment, manufacturing equipment, robots, electronics, or other types of devices, apparatuses, machines, or the like that may be subject to failure and that may be sufficiently complex such that the cause of a failure is not readily apparent to a repairer 154, such as repair personnel, maintenance personnel, or the like. Accordingly, implementations herein are not limited to particular types of equipment.

In response to receiving the repair request 150, the repair management program 126 may invoke the data preparation program 128, the relevant data extraction program 130, and the feature extraction program 132, as discussed additionally below, to prepare and/or extract data from the repair request 150 and determine model inputs from the information in the repair request 150. The repair management program 126 may further invoke the model building and application program 134 to apply the extracted information to the machine learning model(s) 140 to determine one or more probable repair solutions for the repair request.

When there is a likely repair solution, the repair management program 126 may invoke the repair plan execution program 136 to determine and execute a repair plan 156 based on the likely repair solution. In some examples, the repair plan 156, or portion thereof, may be sent to the client computing device 115 that sent the repair request 150. Receipt of the repair plan 156 may cause the repair application 118 on the client computing device 115, such as the repairer computing device 114 in this example, to present the repair plan 156 on the repairer computing device 114 for viewing by a repairer 154, such as on a display associated with the repairer computing device 114. The repairer 154 may then perform the repair based on instructions included in the repair plan 156.

Alternatively, the repair plan execution program 136 may execute some portion of the repair plan 156, such as by sending a parts order 158 to the external computing device 145, scheduling a repairer for repairing the equipment, scheduling a time for the repair to be performed, or the like. For example, the external computing device 145 may be a web server or other suitable computing device including an external application 160 able to receive the parts order 158 and provide the repair part to a repairer 154 at a repair location, or the like. Further, the repair plan execution program 136 may provide repair instructions 162 to an equipment computing device 116. In some examples, the repair instructions 162 may cause the equipment 152 itself to perform a repair or otherwise initiate a repair. For example, the repair application 118 on the equipment computing device 116 may receive the repair instructions 162 and may perform one or more operations in accordance with the repair instructions 162 for performing the repair. Additionally, or alternatively, in some cases, the repair instructions 162 may include computer executable instructions that may be executed by the equipment computing device 116 for performing or otherwise initiating the repair. Accordingly, in some examples, the repair plan execution program 136 may initiate remotely a repair operation via the equipment computing device 116 for performing a repair on the corresponding equipment 152.

Following the repair, the repair application 118 may cause the client computing device 115 associated with a repair to send repair result information 170 to the repair management program 126. In response, the repair management program 126 may store the received result information as new data 172 in the historical repair data 108. The new data 172 may subsequently be used as part of the training data 142 for retraining the one or more machine learning models 140, thereby improving the operation of the one or more machine learning models 140. In addition, if the repair was unsuccessful, in some examples, the repair management program 126 may apply the result information 170 as a new repair request for determining a new or otherwise additional repair plan for the particular piece of equipment 152.

FIGS. 2-18 are flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks, and systems described in the examples herein, although the processes may be implemented in a wide variety of other environments, frameworks, and systems.

Figure 2:
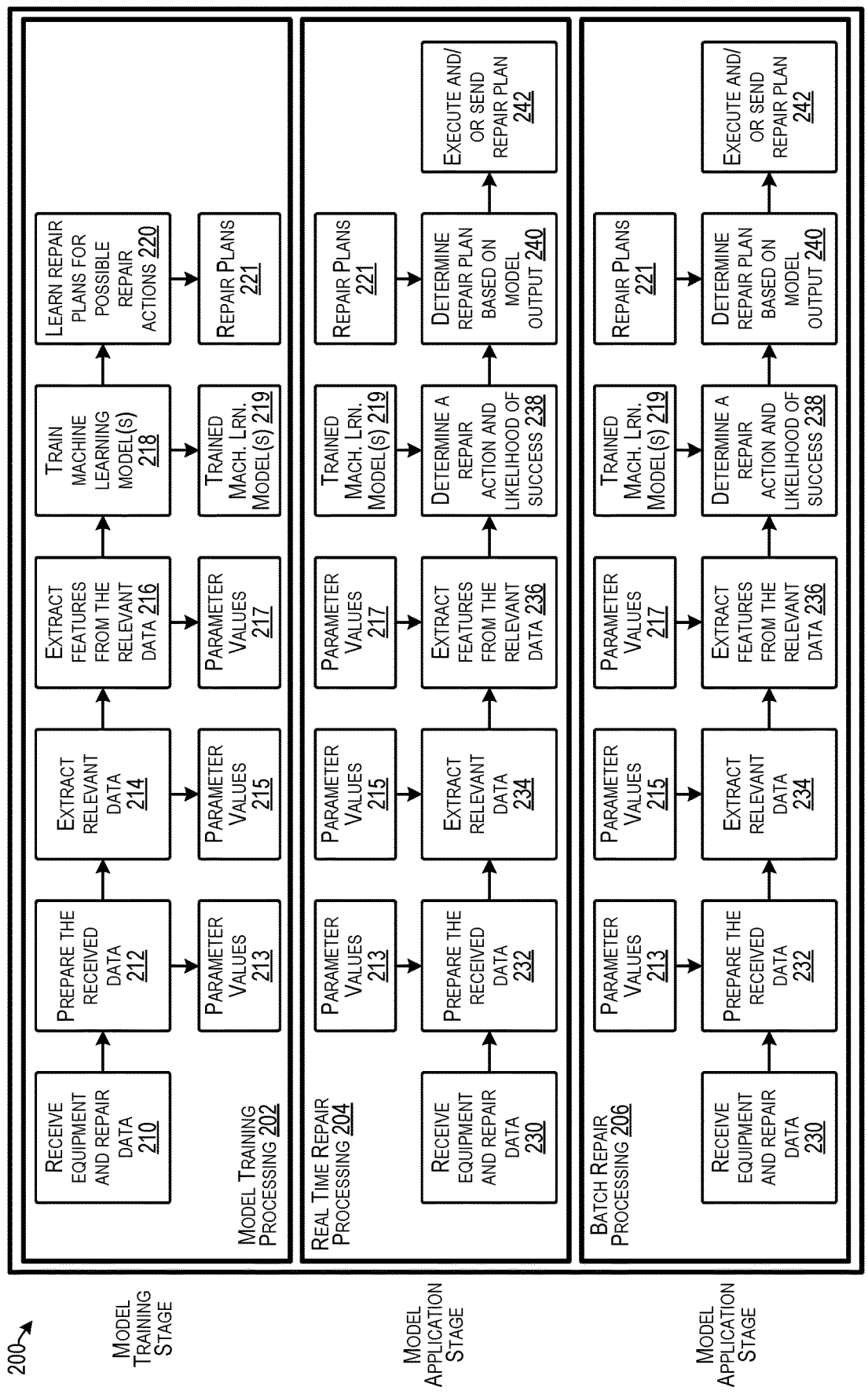
FIG. 2 includes three example flow diagrams illustrating processes that may be executed for model training and application according to some implementations.

FIG. 2 includes three example flow diagrams 200 illustrating processes that may be executed by the repair management program 126 and other functional components discussed above with respect to FIG. 1 using the one or more processors of the service computing device 102. A first flow diagram 202 illustrates a process for model training, a second flow diagram 204 illustrates a process for real time repair processing during a model application stage, and a third flow diagram 206 illustrates a process for batch repair processing. The operations for real time processing and batch processing may be similar in many regards, and accordingly, only differences between the second flow diagram 204 and the third flow diagram 206 are described below.

As discussed above, initially the system may train one or more machine learning models using the historical repair data. For example, the repair data may have been received over time and stored in a database, or the like, for various repair incidents performed by repair personnel for the type or category of equipment for which the machine learning model(s) will be used. For example, if the machine learning model(s) will be used to determine repair plans for trucks, historical repair data for trucks may be accessed for training the machine learning model(s). Similarly, if the machine learning model(s) will be used to determine repair plans for refrigerators, a database of historical repair data for refrigerators may be used. In some examples, the historical repair data may be for the same brand of equipment and, in some cases, for the same model or model line of the equipment, depending on the availability of the historical repair data and the amount of the historical repair data. For instance, the historical repair data may be obtained from databases maintained by equipment manufacturers, equipment repair shops, or the like. Furthermore, in cases in which there is an insufficient amount of historical repair data for a particular brand or model of equipment, historical repair data for other brands and/or models of the equipment may be used in some cases depending on the similarities of the respective brands, equipment, or the like.

The training data obtained from the historical repair data and/or the data included in a repair request received from a client computing device may include or may be associated with a plurality of different types of data as mentioned above, such as equipment attributes, equipment usage data, equipment sensor data, event data, user comments and/or error messages, as well as other user failure-related data, a repair history for the equipment and/or the equipment model, and various types of metadata.

The other failure-related data may include other types of data that may contain more information about the failure to be repaired. Examples of this type of data may include images of defective parts, sound files from recording devices or ultrasonic monitoring devices, videos of the defective equipment or defective parts and so forth. This data may be submitted to the system before or during the repair process.

The repair history for the equipment may include historical repair incidents that have already been performed on the equipment for repairing previous failures. Each prior repair incident may have an associated timestamp that specifies a time at which the prior repair was performed, such as a date and time of day. In some examples, the repair history may also include attributes that describe different aspects of the repair incident, such as a system or subsystem of the equipment that was a source of the failure, one or more components that were replaced or repaired, the parts associated with the repair, and the actions that were performed for the repair such as replacing, cleaning, inspecting, and so forth.

The metadata may describe additional information about the environment in which the equipment is operated. The metadata may include but is not limited to the operating conditions e.g., operating hours, environment conditions such as location, temperature, humidity, and maintenance records such as date, condition of the equipment, operator notes, and the like. The metadata may appear in structured, semi structured, or unstructured formats.

As mentioned above, the computing device may initially train one or more machine learning models using the historical repair data. In this example, the model training processing 202 for training the machine learning model(s) begins at 210.

At 210, the computing device may receive equipment and repair data. For example, the computing device may receive historical repair data including any of the types of data discussed above such as equipment attributes, usage data, sensor data, event data, user comments and error messages, other failure-related data, repair history, and metadata.

At 212, the computing device may invoke the data preparation program to prepare the received data. For example, the data preparation program may be executed to remove noise from the received data and transform various different data types into one or more formats that may be used for further analysis. For example, for categorical and numerical data (such as equipment attributes and usage data) and time-series data (such as sensor data), the computing device may remove noise and outliers from the data and further may impute any missing data.

Noise and outlier removal may include detecting noise and outliers in the data values or the sensor readings and removing or replacing these data values with values calculated based on similar or nearby records or other readings of the same sensor (e.g., using an average or median of nearest neighbors). Furthermore, the noise removal may include the removal of noise due to data-entry errors and removal of repair mistakes or ineffective repairs. For example, repairs that did not result in solving the failure may be removed as not being of use for training the machine learning model. As one example, ineffective repairs may be detected by identifying equipment that was returned for repair with a similar complaint within a short time following a first repair. Additionally, as discussed below, ineffective repairs may also be identified explicitly by repairer feedback, and may be subsequently removed from the training data when the model is retrained.

Furthermore, imputation of missing data may include imputing missing values by interpolating values of similar or nearby records, or other readings of the sensor time series at nearby timestamps. In some cases, the imputation may be conducted using a regression model for the original time series and finding the values of the regression function at common timestamps, although other techniques will be apparent to those of skill in the art having the benefit of the disclosure herein.

In addition, the data preparation performed herein may include natural language data preparation of any received natural language data. As an example, for a user comment, such as a complaint about the equipment, the computing device may initially convert the user comment to a text format. For instance, if the user comment is available as an image of a handwritten note, the system may employ an optical character recognition (OCR) algorithm to recognize the text of the user comment. Alternatively, if the user comment is available as a voice note, the computing device may employ a speech-to-text algorithm to convert the speech signal into a natural-language text.

After the text of the user comment is extracted, the extracted text may be cleaned, such as by removing special characters, removing stop words, normalizing abbreviations, normalizing synonyms, correcting typos, and performing stemming. For example, special characters (e.g. ";", "#", "!", "@"), may be removed from the input text, and the text may further be tokenized into words (tokens), such as in lower case letters. Furthermore, domain-specific tokens may be normalized to a unified format (e.g., error codes "1234/567" and "1234567" may be normalized to a consistent format, and measurements such as "30 mph" and "30 mph" may be similarly normalized).

Additionally, stop word removal includes the removal of common words that do not add useful information to the problem description (e.g., "in", "a", "of", "the", "is"). This step might utilize a general purpose or domain-specific list of stop-words. Furthermore, normalization of abbreviations may expand and normalize abbreviations encountered in the text, such as by changing "cel" to "check engine light", etc. In addition, synonyms may be normalized to a selected term by identifying and normalizing pairs of synonyms in the domains. Further, text correction may include detecting and correcting typos in the text, such as changing "leek" to "leak" and so forth. Finally, stemming may include converting all words to their stem to reduce the lexical variations in the input text (e.g., "leaked", "leaking" and "leaks" may all be converted to the stem "leak"). The aforementioned cleaning steps can also be applied to other data types that include unstructured text, such as error messages from computer systems inside the equipment or in the environment of the equipment. Additionally, for other data types, such as images, sound files, or video files, standard data cleaning and preparation techniques may be applied, as is known in the art. Furthermore, parameter values 213 used by the data preparation program for preparing the training data may be logged and used subsequently by the data preparation program when preparing data received with a repair request during the model application stage as discussed additionally below.

At 214, the computing device may invoke the relevant data extraction program to extract relevant data from the prepared data. For example, this operation may include extracting segments of data that are related to the repair at hand. Given the time of failure $t_f$, the following data segments may be extracted:

(a) Equipment attributes: the computing device may extract all the attributes of the equipment subject to repair.

(b) Usage data: the computing device may extract the usage data at the time of the failure $t_f$. If usage data is not available at that time, the computing device may extrapolate the latest usage data to estimate the usage at $t_f$.

(c) Sensor data: the computing device may extract all sensor measurements within a first threshold time period $T_1$ before the time of failure $t_f$.

(d) Event data: the computing device may extract all events within a second threshold time period $T_2$ before the time of failure $t_f$.

(e) User comments and error messages: the computing device may use all natural-language comments and error messages generated before the failure, or following the failure during the repair process.

(f) Other failure-related data: the computing device may extract all other failure-related data files generated before or during the repair process.

(g) Repair history: for training data, the computing device may extract all the details of prior repair processes (e.g., system(s), subsystem(s), component(s), part(s), and repair action(s) performed), and use these details as the target labels that are to be learned by the machine learning model.

(h) Metadata: for time-varying data, the computing device may extract only data instances within a third threshold time period $T_3$ before the time of failure $t_f$. For static data, the computing device may extract all the attributes related to the equipment or environment. Furthermore, parameter values 215 used by the relevant data extraction program for extracting the training data may be logged and used subsequently by the relevant data extraction program when extracting data from data received with a repair request during the model application stage as discussed additionally below.

At 216, the computing device may invoke the feature extraction program to perform feature extraction from the multi-modal extracted data. For example, given the variables that were extracted during the relevant data extraction operation discussed above, the computing device may use the variables as input to a deep learning architecture, or the like. For example, the deep learning architecture may be configured to integrate multi-modal high-dimensional sparse data as well as dense data. Further, the deep learning architecture may enable importance modeling of events to extract relevant event data using user comments, equipment attributes, and usage data as context information. In addition, the deep learning architecture herein includes a training mechanism to output consistent and accurate structured repairs.

As discussed additionally below, e.g., with respect to FIGS. 3-15, the features extracted by the computing device may be transformed to feature vectors for the respective repair incident. For training data, the features may be combined into an n×m feature matrix X where the (i, j)-th element represents the value of feature j for repair i, where n is the number of features and m is the number of repair incidents. Additional details of the feature extraction are discussed below with respect to FIGS. 3-15. Furthermore, parameter values 217 used by the feature extraction program for extracting the features from the training data may be logged and used subsequently by the feature extraction program when extracting features from data received with a repair request during the model application stage, as discussed additionally below.

At 218, the computing device may train the machine learning model(s) using the extracted features. For instance, to recommend repair actions, a machine learning model, such as a deep neural network, recurrent neural network, or other deep learning model may be trained to map between the extracted features and the corresponding repair actions. Other types of machine learning models may additionally, or alternatively, be used, as enumerated elsewhere herein. Training of the machine learning models is discussed additionally below, e.g., with respect to FIG. 16.

The trained machine learning model(s) 219 may be configured to output one or more options for repair actions that may be performed for maintenance or other repair of the equipment along with a probability of success for each output repair action. The probability of success may indicate a likelihood that the repair action will successfully repair a current failure based on the historical repair data.

At 220, the computing device may learn or otherwise determine repair plans 221 corresponding to the possible repair actions that may be output by the trained machine learning model(s) 219. For example, during the model training stage, the repair plan execution program may learn from the historical repair data, or other sources, the steps taken for implementing each different repair action that may be determined by the machine learning model. For example, for each repair action that may be a possible outcome of a machine learning model, the repair plan execution program may obtain, e.g., from the extracted data or other data sources, the repair steps that are indicted to be used for performing the repair. Additionally, in some cases, the repair plan execution program may access other data sources, such as an equipment repair manual from the equipment manufacturer, to obtain the repair steps for each possible repair action that may be output by the machine learning model.

Based on the learned repair steps for each repair action, subsequently, during the model application stage, the repair plan execution program may, in some examples, execute one or more of the aforementioned steps using the learned repair plan. Further, in the case that there are multiple repair options for a particular failure, the repair plan execution program may select one of the options so that the overall repair cost may be minimized, and the availability of the equipment may be maximized. The information about the impact of each repair action (cost and time) may be obtained from external sources or from the historical repair data. Accordingly, the repair plan execution program may configure the service computing device to generate one or more repair plans 221 based on one or more outputted repair actions output by the machine learning model(s).

Following training of the machine learning model(s) and following configuration of the repair plan execution program to generate repair plans for the possible repair actions that may be recommended by the machine learning model, the system is ready to execute at the model application stage for either real time processing and as indicated at 204 or batch processing as indicated at 206. As mentioned above, these processes are similar. For instance, the real time processing may take place as the request for repair is communicated to the service computing device, whereas the batch processing may take place after the fact, i.e., at some time (minutes, hours, days) after the repair request has been sent to the service computing device.

At 230, the computing device may receive equipment and repair data, such as in a repair request from a client computing device, e.g., as discussed above with respect to FIG. 1. Further, the service computing device may also receive some equipment and repair data relative to the particular equipment from the historical repair data or other sources. For example, the equipment attributes, the usage data, the event data, and the repair history may be obtained from the historical repair data or other sources. Further, the service computing device may receive sensor data and error messages from the equipment itself or from one or more devices associated with the equipment. In addition, the service computing device may receive user comments and other failure related data from the client computing devices or from other devices associated with equipment users.

At 232, the computing device may prepare the received data corresponding to the repair request. For example, the computing device may invoke the data preparation program to remove noise from the received data, normalize the received data, and transform various different data types into one or more formats that can be used for further analysis, as discussed above at 212. The parameter values 213 used during the training stage may be used to prepare the received data. Further, in some cases, the operations 232-240 may be the same for the real time stage 204 and the batch stage 206. However, in other cases the operations 232-240 executed during the batch repair processing stage 206 may differ from the operations 232-240 executed during the real time repair processing stage 204. For example, although the respective operations 232-240 may perform the same function in each stage 204 or 206, the processing steps may be different, such as due to a difference in the nature of the received data 230 to be prepared at 232.

As one example, when determining repairs to recommend for a batch of input cases, some implementations may construct all of the features in parallel, pass a feature matrix which contains all the features for all the input cases, and run a parallel program to multiply this feature matrix with the weights of the model to determine the repair with the highest probability of success for each case. On the other hand, when performing real time data processing, the same operations may be performed using a single vector of features for the case at hand. Accordingly, the algorithm logic may be the same, but the implementation code may be different, e.g., for implementing matrix operations on parallel machines during batch mode as compared with using vector multiplication on a single machine for the real time mode. In some cases, the same code may be used for both batch mode and real time mode, such as by making the real time operation a special case of the batch operation. In other cases, separate code may be employed for the real-time case and the batch case. Further, other variations will be apparent to those of skill in the art having the benefit of the disclosure herein.

At 234, the computing device may extract relevant data from the prepared data. For example, the computing device may invoke the relevant data extraction program to extract relevant data as discussed above at 214 and as discussed additionally below. The parameter values 215 used during the training stage 202 may be used to extract relevant data such as equipment attributes, usage data, sensor data, event data, user comments and error messages, other failure-related data, repair history, and metadata.

At 236, the computing device may extract features from the extracted relevant data. For example, the computing device may invoke the feature extraction program to extract features from the relevant data, as discussed above at 216, and as discussed additionally below. The parameter values 217 used during the training stage may be used to extract features for each variable, such as time-varying variables (e.g., window-level statistics, trends, correlations, and sequential patterns), static variable, and free text variables.

At 238, the computing device may determine a repair action and likelihood of success. For example, the computing device may invoke the model building and application program to input the extracted features into the trained machine learning model(s) 219. The trained machine learning model(s) 219 may be executed using the extracted features as inputs to determine, as outputs of the trained machine learning model(s), one or more repair actions and a probability of success of each of the repair actions.

At 240, the computing device may determine a repair plan based on the model output. For example, the computing device may invoke the repair plan execution program to determine one or more repair plans based on the output of the trained machine learning model. As mentioned above, the repair plan execution program may select one or more repair plans 221 determined, e.g., from historical repair data or the like, as described above at 220, for implementing the repair action determined by the trained machine learning model. If there are multiple options for repair actions, the repair plan execution program may be configured to select the repair action(s) that are indicated to have the higher probability of success. Furthermore, if the probability of success for all of the determined repair actions received from the trained machine learning model(s) are below a threshold probability of success, the repair plan execution program may perform an analysis to determine whether it is more beneficial to recommend one of the repair actions or send an indication that the repair action is unknown. The determination may be based on whether the overall maintenance cost is minimized, and the availability of the equipment is maximized. The information about the impact of each repair step (e.g., cost and time) may be obtained from external data sources, domain knowledge, and/or learned from historical repair records.

At 242, the computing device may execute and/or send the repair plan or a portion of the repair plan to a client computing device associated with the received repair request. In some examples, the repair plan execution program may execute at least a portion of the repair plan to implement the repair action determined by the machine learning model. For instance, executing the repair plan may include, but is not limited to, ordering replacement parts for performing the repair, assigning a repairer to perform the repair, scheduling a repair time for repairing the equipment, and/or remotely applying a repair to the equipment, such as in the case of an automatic diagnosis, changing operating conditions of the equipment, performing a remote firmware upgrade, remotely adjusting settings of the equipment, remotely initiating cleaning of the equipment, remotely initiating calibration of the equipment, and so forth. Furthermore, in some examples, the repair plan execution program may send instructions to the repairer computing device for presentation on the repairer computing device. Additionally, in still other examples, the repair plan execution program may send instructions to the equipment itself, such as to the equipment computing device, which may then perform or otherwise initiate the repair independently based on the received instructions. Numerous other variations will be apparent to those of skill in the art having the benefit of the disclosure herein.

Figure 3:
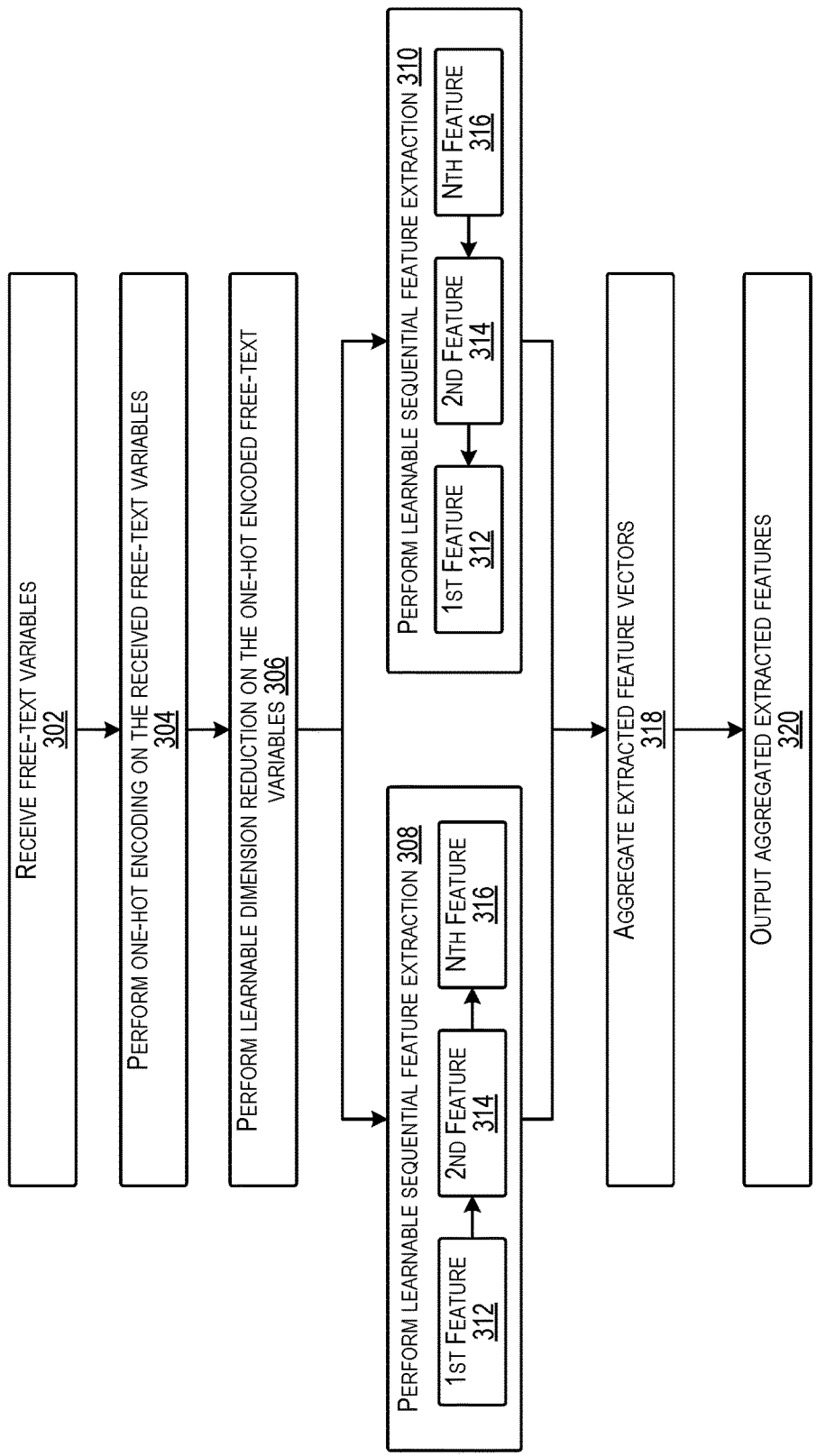
FIG. 3 is a flow diagram illustrating an example process for extracting features from free-text variables according to some implementations.
Figure 4:
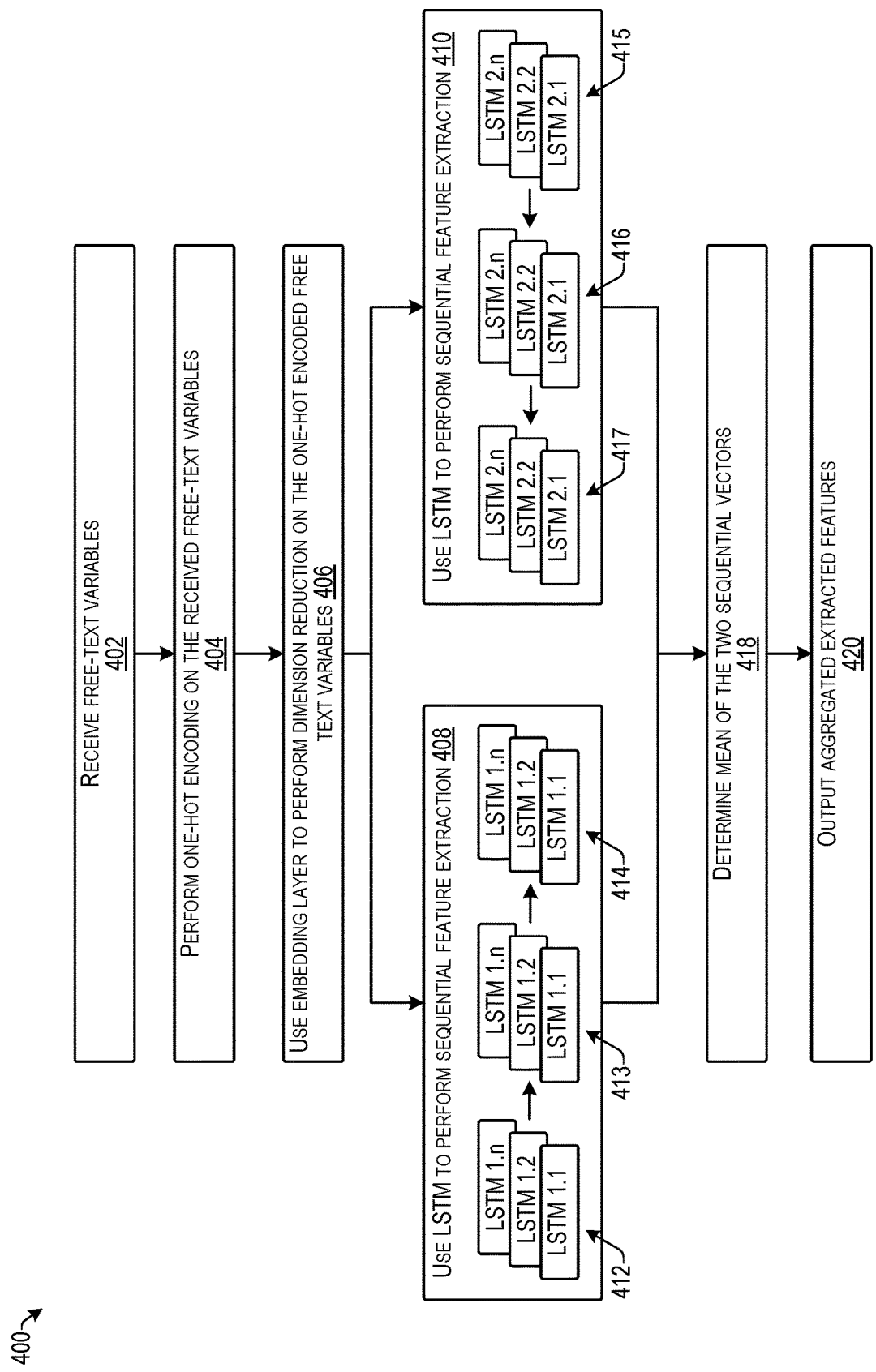
FIG. 4 is a flow diagram illustrating an example process for extracting features from free-text variables according to some implementations.

FIG. 3 is a flow diagram illustrating an example process 300 for extracting features from free-text variables according to some implementations. For example, the techniques described herein may be applied during operations 214-216 and/or 234-236 discussed above with respect to FIG. 2. In general, a repair may be associated with information obtained from multiple data sources. For example, a natural language complaint or other comment from the user may be synonymous to a symptom. The system herein may obtain information about the equipment that is to be repaired, because not all repairs may be applicable to all equipment types. Diagnostic information and events are rich information that may serve as a guide for determining an appropriate repair. Accordingly, input information may be received in a variety of modalities of data that, when combined, may provide an optimal repair for the equipment. However, the multiple information sources may provide data in different formats. For example, some data may be categorical and some data may be continuous. The features to be extracted from each different type of data may be dependent on the data modality. Accordingly, implementations herein are configured to process multi-modal data to extract appropriate information for determining an optimal repair plan for the equipment.

As mentioned above, free text may be received by the system such as from written or spoken comments made by an equipment user, a repairer, or from various other sources. For free text variables, each word may be encoded into a dictionary and represented numerically. In some examples, the words may be represented by one-hot coded vectors, where the length of a vector is equal to the number of unique words in a corresponding corpus (e.g., the dictionary). This results in free-text comments and/or other free text variables being represented as a sequence of one-hot encoded vectors (e.g., high-dimensional and sparse).

One-hot encoding is a process by which categorical variables are converted into a format in which a machine learning model is better able to use the variables for training and/or prediction. For instance, one-hot encoding may be used to perform binarization of categories so that categorized inputs may be included as a feature for a machine learning model. As one example, each received input may be categorized by indicating a "1" if the category is met or a "0" if a category is not met. One-hot encoding may be represented as a vector in which all the elements of the vector are "0" except one, which has "1" as its value. For example, [0 0 0 1 0 0] may be a one-hot vector in which the input matches the fourth category in a six-category vector. One-hot encoding may result in a high-dimensional sparse matrix. For instance, in the case of a dictionary with 10,000 words, following one-hot encoding, each row of the matrix may have a "1" in one position corresponding to the matching word, and a "0" in the other 9,999 positions.

As illustrated in FIG. 3, the high-dimensional and sparse free-text variables may be mapped onto a low-dimensional continuous variable space using a learnable dimension reduction method. In some cases, the learnable dimension reduction method may be performed using an embedding matrix. For instance, the embedding matrix may map a high-dimensional sparse vector to a low-dimensional dense vector. The result of dimension reduction may include a sequence of low-dimensional dense vectors.

Because the free text variables may correspond to natural language sentences, the resulting low-dimensional dense vectors may have a sequential dependency on each other. To extract features, a learnable sequential feature extraction method may be applied. One example of a suitable sequential feature extraction method may be the use of Long Short-Term Memory (LSTM) units. Another example of a suitable sequential feature extraction technique is Conditional Random Field (CRF) extraction. The feature extraction process may extract features from the first vector on the left (representing the first word of the sentence or phrase) to the last vector on the right (representing the last word). For robustness, implementations herein may also extract sequential features from right to left as well, thus resulting in two feature vectors from each free-text comment.

In addition, the determined feature vectors may be combined or otherwise aggregated to determine a final feature vector from the free-text comment and/or free-text variables. As one example, the feature vectors may be aggregated by calculating the mean of the two feature vectors. The parameters of the learnable dimension reduction and the sequential feature extraction methods (left to right, and right to left) are learned during the model training process, such as based on optimization of an error/loss function.

At 302, the service computing device may receive free text variables. For example, the service computing device may receive written or verbal complaints or other comments related to the equipment from the user of the equipment, the repairer of the equipment, a manager, or other personnel associated with the equipment.

At 304, the service computing device may perform one-hot encoding on the received free text variables. For example, the service computing device may categorize each word in the received free text according to a dictionary, such as by matching each word in the received free text to one of the words in the dictionary in a one-hot encoding matrix.

At 306, the service computing device may perform learnable dimension reduction on the one-hot encoded free text variables. As mentioned above, the learnable dimension reduction may be performed using an embedding matrix or the like. For instance, the embedding matrix may map a high-dimensional sparse vector to a low-dimensional dense vector. Thus, the dimension reduction may produce a plurality of low-dimensional dense vectors, e.g., one vector for each word in the received free text, and the vectors may have a sequential dependency on each other.

At 308 and 310, the service computing device may perform learnable sequential feature extraction on the plurality of the vectors. For instance, the learnable sequential feature extraction may be performed for each vector 1-N. Thus, at 308, the feature extraction process may extract a first feature 312 from the first vector on the left (representing the first word of the sentence or phrase) to the second feature 314, representing the second word, to the Nth feature 316 on the right (representing the last word). Additionally, at 310, for robustness, implementations herein may also extract sequential features from right to left as well, e.g., from 316 to 314 to 312, thus resulting in two feature vectors from each free-text comment.

At 318, the service computing device may aggregate the extracted features by combining the two feature vectors from 308 and 310 respectively. As one example, the two feature vectors may be aggregated by calculating the mean of the two feature vectors.

At 320, the service computing device may output the aggregated extracted features for use with a machine learning model, such as for model training during a model training stage, or for use as an input to the model during a model application stage.

This example may employ LSTM units for the sequential feature extraction method.

At 402, the service computing device may receive free text variables. For example, the service computing device may receive written or verbal complaints or other comments related to the equipment from the user of the equipment, the repairer of the equipment, a manager, or other personnel associated with the equipment.

At 404, the service computing device may perform one-hot encoding on the received free text variables. For example, the service computing device may categorize each word in the received free text according to a dictionary, such as by matching each word in the received free text to one of the words in the dictionary in a one-hot encoding matrix.

At 406, the service computing device may use an embedding layer to perform dimension reduction on the one-hot encoded free text variables. As mentioned above, the dimension reduction may be performed using an embedding matrix or the like. For instance, the embedding matrix may map a high-dimensional sparse vector to a low-dimensional dense vector. Thus, the dimension reduction may produce a plurality of low-dimensional dense vectors, e.g., one vector for each word in the received free text, and the vectors may have a sequential dependency on each other.

At 408 and 410, the service computing device may use LSTM units to perform learnable sequential feature extraction on the plurality of the vectors. For instance, an LSTM unit is applied to each vector 1 to N where a relevant feature is extracted from each vector. Thus, at 408, the feature extraction process may progress from the first vector on the left (representing the first word of the sentence or phrase), as indicated at 412, to the next vector, (representing the second word), as indicated at 413, to the Nth vector on the right (representing the last word), as indicated at 414. The same LSTM unit(s) extract(s) features from each vector, and there can be multiple such LSTM units, e.g., LSTM 1.1, LSTM 1.2, . . . , LSTM 1.n, in this example for extracting features from each vector. As a result, the features extracted from each LSTM unit form a resultant vector. Additionally, at 410, for robustness, implementations herein may also extract sequential features from right to left as well, as indicated at

415, 416, and 417, using multiple LSTM units, LSTM 2.1, LSTM 2.2, . . . , LSTM 2.n, ultimately resulting into a second feature vector. Thus, traversing of LSTM units from left to right and vice-versa results the generation of two feature vectors from each free text comment.

At 418, the service computing device may calculate the mean of the two feature vectors to combine the two feature vectors.

At 420, the service computing device may output the aggregated extracted features for use with a machine learning model, such as for model training during a model training stage, or for use as an input to the model during a model application stage.

Figure 5:
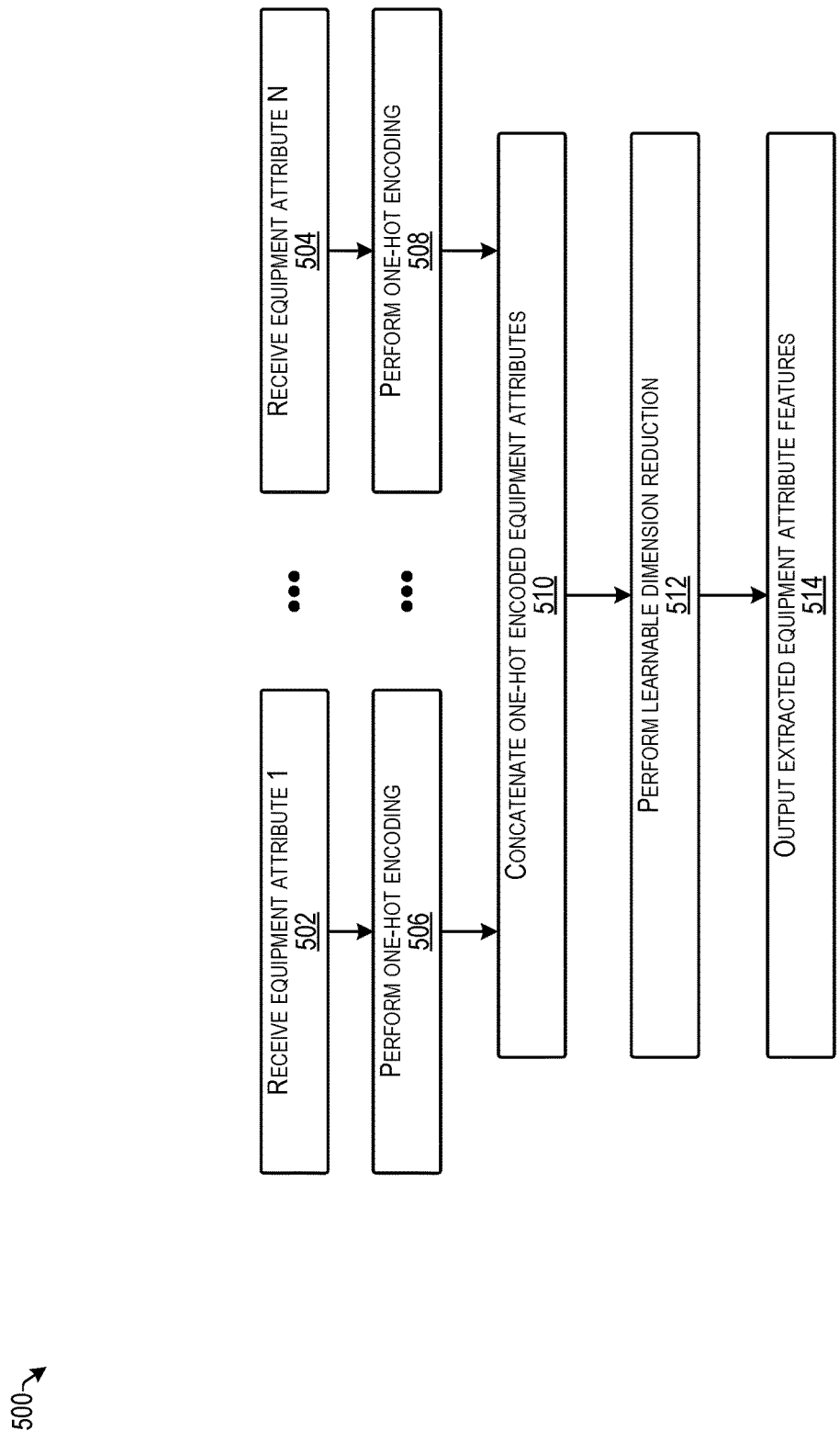
FIG. 5 is a flow diagram illustrating an example process for extracting features from equipment attributes according to some implementations.

FIG. 5 is a flow diagram illustrating an example process 500 for extracting features from equipment attributes according to some implementations. For example, the equipment attributes may be categorical data and may be represented as one-hot coded vectors. After converting each equipment attribute into a one-hot coded vector, some examples herein may concatenate or otherwise combine all the extracted vectors, thereby forming a high-dimensional and sparse vector. Similar to the free text variables discussed above, some implementations herein may employ a learnable dimension reduction process to convert the high-dimensional and sparse vectors into low-dimensional and dense vector. One example of a suitable learnable dimension reduction technique includes use of an embedding matrix.

At 502 through 504, the service computing device may receive 1st through nth equipment attributes. As mentioned above, the equipment attributes may be received from various data sources, such as equipment manufacturers, historical equipment data, domain knowledge, equipment users, or the like.

At 506 through 508, the service computing device may perform one-hot encoding on the received equipment attributes 1 through N. Similar to the example discussed above for the free text variables, the one-hot encoding may result in a plurality of high-dimensional sparse vectors.

At 510, the service computing device may concatenate the one-hot encoded equipment attribute vectors.

At 512, the service computing device may perform learnable dimension reduction on the concatenated high-dimensional sparse vectors. As one example, an embedding matrix may be used for the dimension reduction of the sparse vectors. Principal Component Analysis (PCA) and Latent Semantic Indexing (LSA) are examples of other techniques that can be used for the dimension reduction of the sparse vectors.

At 514, the service computing device may output the extracted equipment attribute features for use with a machine learning model, such as for model training during a model training stage, or for use as an input to the model during a model application stage.

Figure 6:
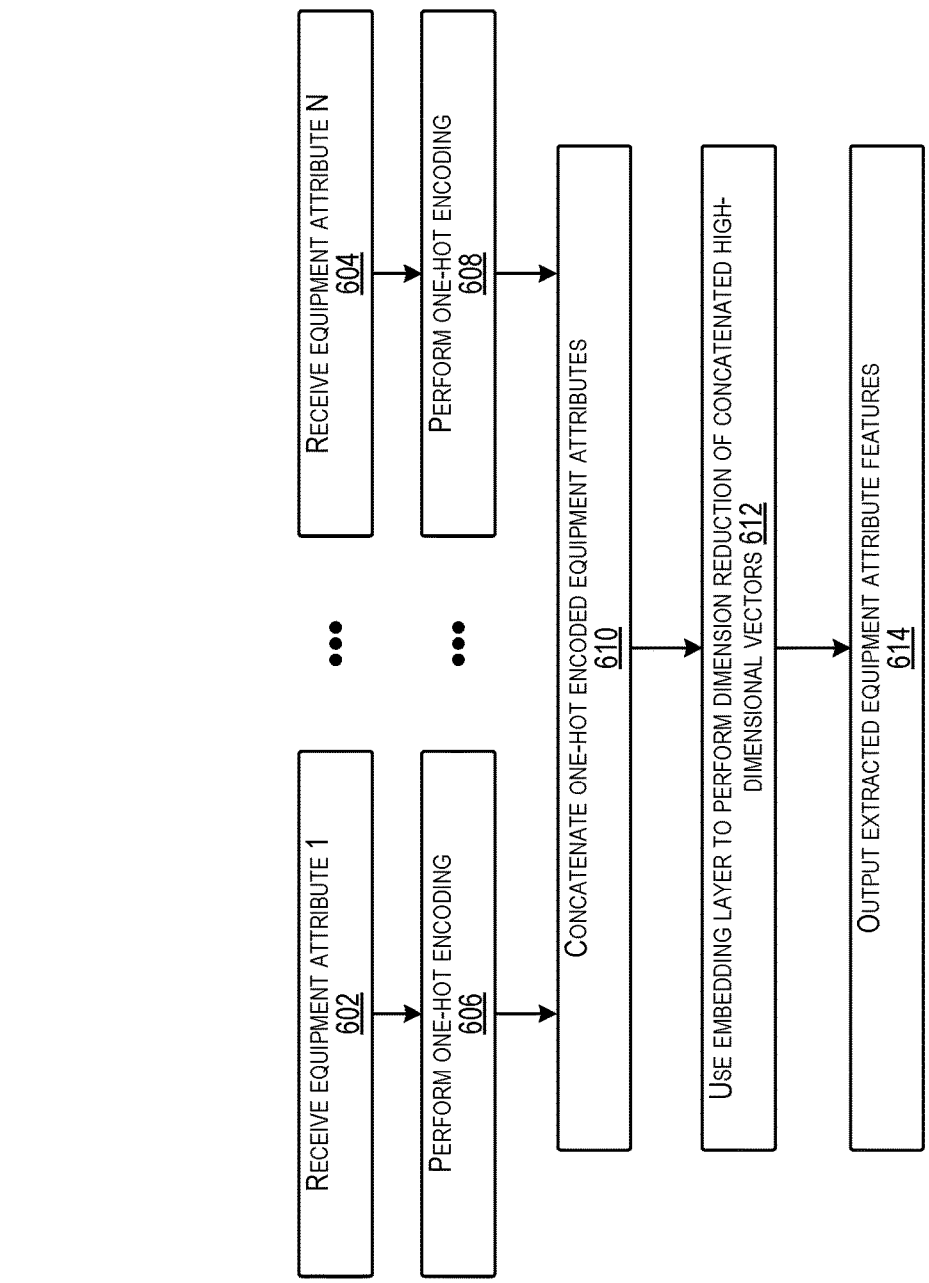
FIG. 6 is a flow diagram illustrating an example process for extracting features from equipment attributes according to some implementations.

FIG. 6 is a flow diagram illustrating an example process 600 for extracting features from equipment attributes according to some implementations. In this example, an embedding layer may be used for dimension reduction.

At 602 through 604, the service computing device may receive 1st through Nth equipment attributes. As mentioned above, the equipment attributes may be received from various data sources, such as equipment manufacturers, historical equipment data, domain knowledge, equipment users, or the like.

At 606 through 608, the service computing device may perform one-hot encoding on the received equipment attributes 1 through N. Similar to the example discussed above for the free text variables, the one-hot encoding may result in a plurality of high-dimensional sparse vectors.

At 610, the service computing device may concatenate the one-hot encoded equipment attribute vectors.

At 612, the service computing device may use an embedding layer to perform dimension reduction on the concatenated high-dimensional sparse vectors. As one example, an embedding matrix may be used for the dimension reduction of the sparse vectors.

At 614, the service computing device may output the extracted equipment attribute features for use with a machine learning model, such as for model training during a model training stage, or for use as an input to the model during a model application stage.

Figure 7:
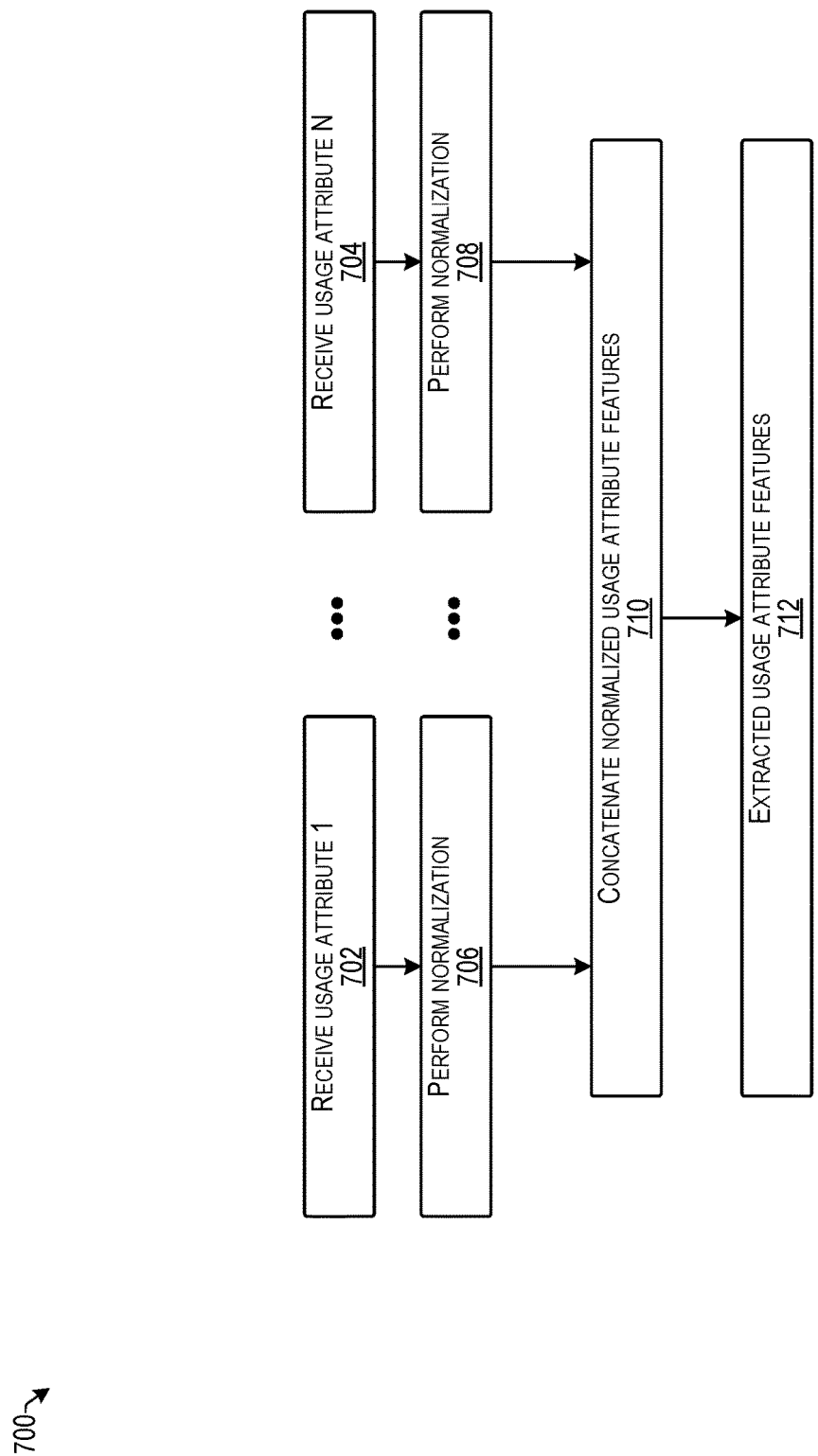
FIG. 7 is a flow diagram illustrating an example process for extracting features from usage attributes according to some implementations.

FIG. 7 is a flow diagram illustrating an example process 700 for extracting features from usage attributes according to some implementations.

At 702 through 704, the service computing device may receive usage attributes 1 through N. As mentioned above, the usage attributes may be received from the equipment itself, from the historical repair data, from domain knowledge, from the equipment user, from the equipment repairer, or the like. The usage attribute variables may be continuous variables.

At 706 through 708, the service computing device may normalize the received usage attributes. As one non-limiting example, normalizing may include normalizing the values of the received usage attributes to, e.g., be within a range from 0 to 1, although numerous other data normalization techniques will be apparent to those of skill in the art having the benefit of the disclosure herein.

At 710 the service computing device may concatenate or otherwise combine the normalized usage attribute variables to determine a usage attribute feature vector.

At 712, the service computing device may output the extracted usage attribute features.

Figure 8:
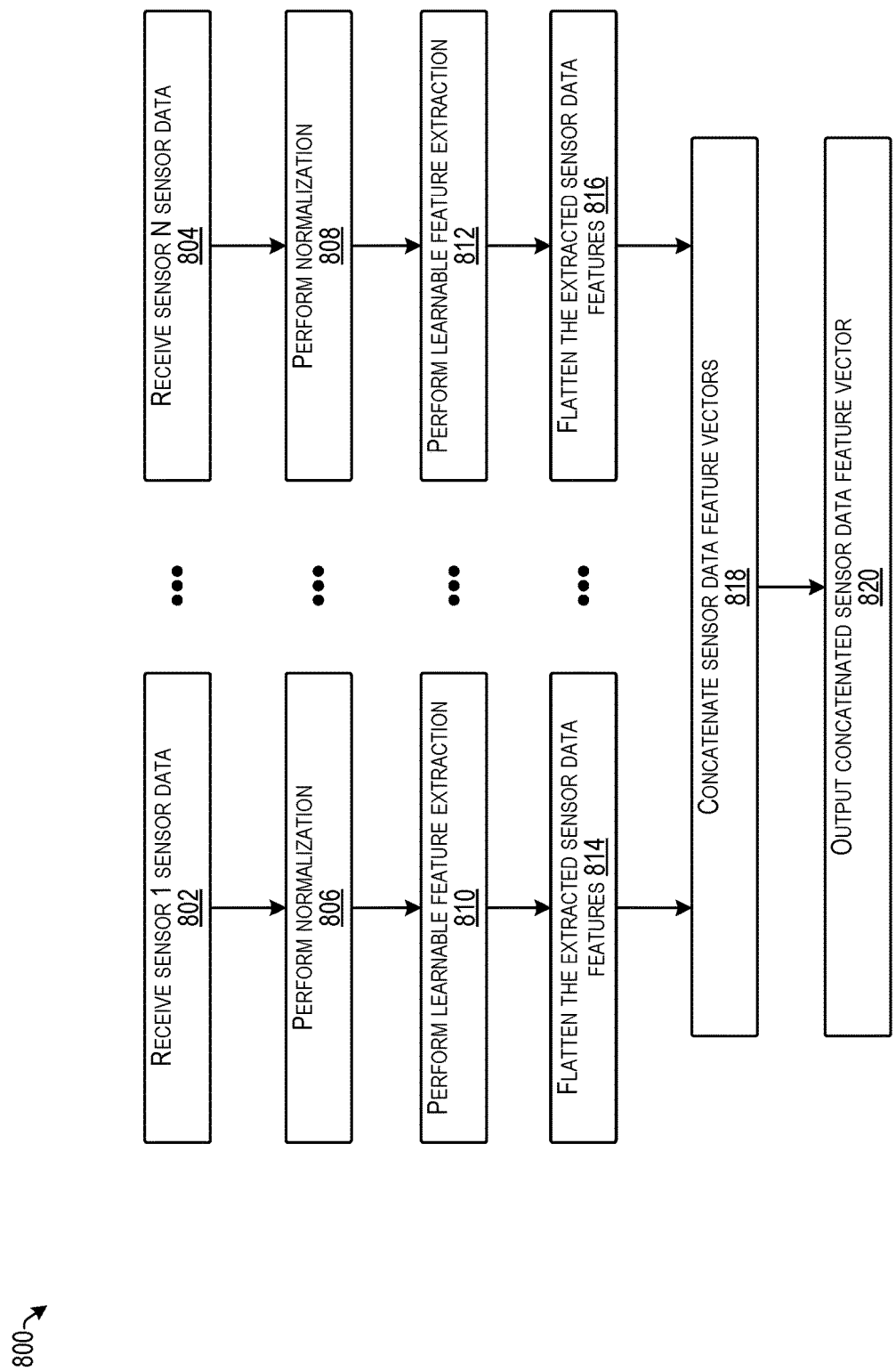
FIG. 8 is a flow diagram illustrating an example process for extracting features from sensor data according to some implementations.

FIG. 8 is a flow diagram illustrating an example process 800 for extracting features from sensor data according to some implementations.

At 802 through 804, the service computing device may receive sensor data from a first sensor through an Nth sensor. As mentioned above, the sensor data may be received from the equipment itself, from a system associated with the equipment, from the historical repair data, from the equipment user, from the equipment repairer, or the like. The sensor data may be high frequency or low frequency data, and may be represented as a continuous and dense vector.

At 806 through 808, the service computing device may normalize the received sensor data. As one non-limiting example, normalizing may include normalizing the values of the received sensor data to, e.g., a range from 0 to 1, although numerous other data normalization techniques will be apparent to those of skill in the art having the benefit of the disclosure herein.

At 810 through 812, the service computing device may perform learnable feature extraction on the normalized sensor data. As one example, the features may be extracted using a learnable non-sequential method, such as LSTM units. The parameters of the learnable non-sequential method are learned during the training process.

At 814 through 816, the service computing device may flatten the extracted sensor features. For example, flattening the sensor data features may include converting the extracted features for each sensor into a one-dimensional (1-D) feature vector, e.g., a single feature vector for each sensor.

At 818 the service computing device may concatenate or otherwise combine the extracted sensor data feature vectors to determine a single sensor data feature vector.

At 820, the service computing device may output the sensor data feature vector for use with a machine learning model, such as for training during a model training stage, or as an input during a model application stage.

Figure 9:
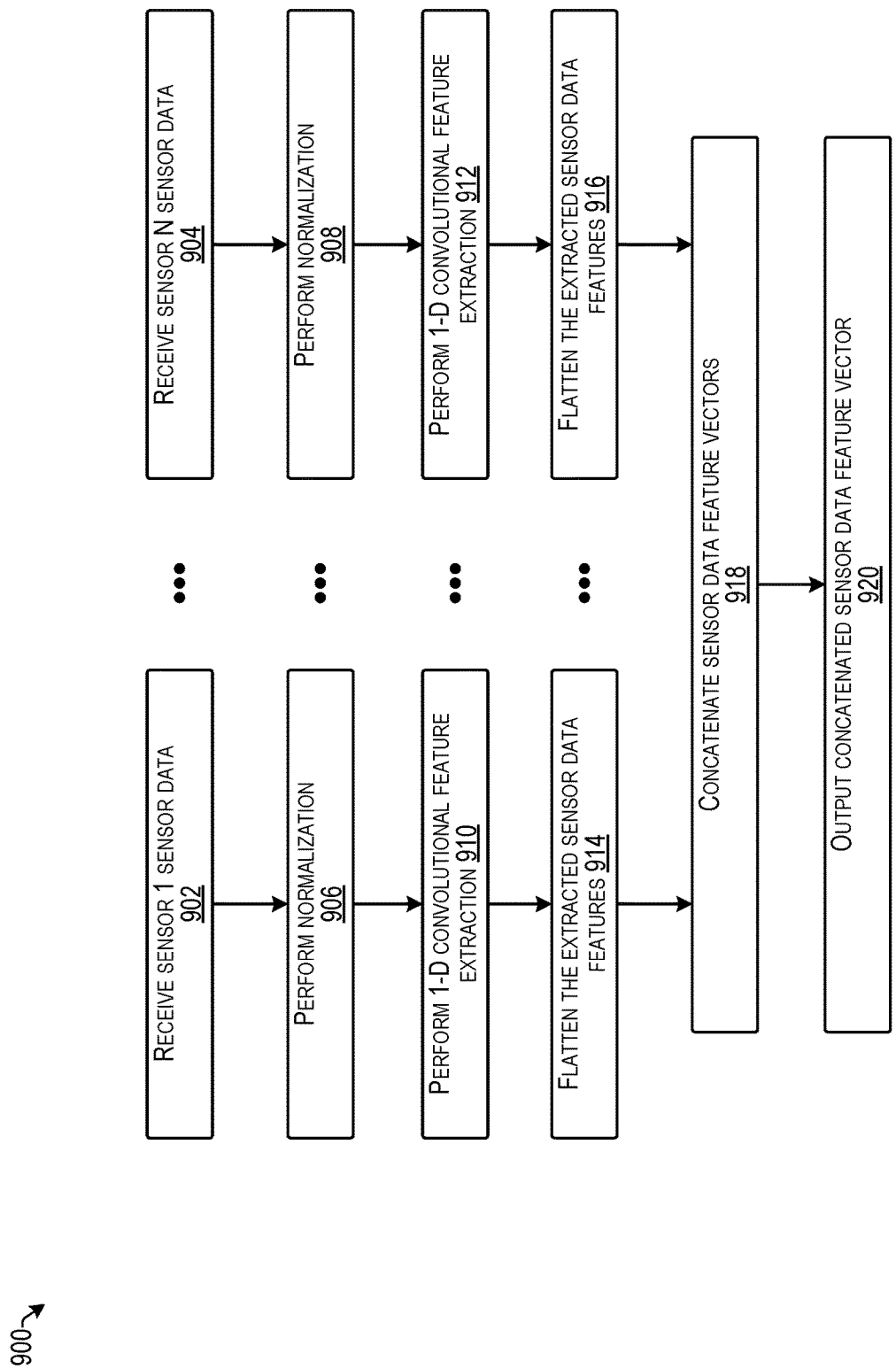
FIG. 9 is a flow diagram illustrating an example process for extracting features from sensor data according to some implementations.

FIG. 9 is a flow diagram illustrating an example process 900 for extracting features from sensor data according to some implementations.

At 902 through 904, the service computing device may receive sensor data from a first sensor through an Nth sensor. As mentioned above, the sensor data may be received from the equipment itself, from a system associated with the equipment, from the historical repair data, from the equipment user, from the equipment repairer, or the like. The sensor data may be high frequency or low frequency data, and may be represented as a continuous and dense vector.

At 906 through 908, the service computing device may normalize the received sensor data. As one non-limiting example, normalizing may include normalizing the values of the received sensor data to, e.g., have a value within a range from 0 to 1, although numerous other data normalization techniques will be apparent to those of skill in the art having the benefit of the disclosure herein.

At 910 through 912, the service computing device may perform 1-D convolutional feature extraction on the normalized sensor data. As one example, the features may be extracted using a learnable method such as with 1-D convolutional filters. A set of 1-D convolutional filters may traverse across the time axis for each sensor signal performing convolution to extract the relevant features. For instance, each convolution may extract different relevant features. As a result of this, a set of features from the sensor signal is extracted. The parameters of the learnable method, e.g., the 1-D convolutional filters, are learned during the training process.

At 914 through 916, the service computing device may flatten the extracted sensor features. For example, flattening the sensor data features may include converting the extracted features for each sensor into a 1-D feature vector, e.g., a single feature vector for each sensor.

At 918 the service computing device may concatenate or otherwise combine the extracted sensor data feature vectors to determine a single sensor data feature vector.

At 920, the service computing device may output the sensor data feature vector for use with a machine learning model, such as for training during a model training stage, or as an input during a model application stage.

Figure 10A:
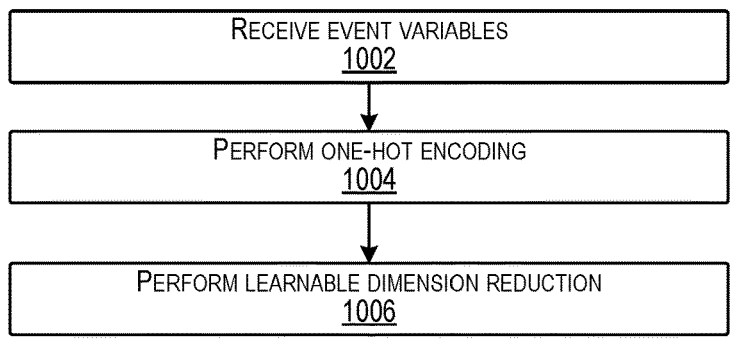
FIG. 10A is a flow diagram illustrating an example process for preliminary extraction of features from event data according to some implementations.

FIG. 10A is a flow diagram illustrating an example process 1000 for preliminary extraction of features from event data according to some implementations. The event data may have sequential dependency on each other in some examples, while in other examples, the event data may be independent of each other. For instance, some events may be related to each other, while other events may be entirely independent. The process 1000 of FIG. 10A may be employed when there is no sequential dependency between events, e.g., the events are independent of each other.

At 1002, the service computing device may receive event variables. For example, the event variables may be received from the equipment, from a system associated with the equipment, from the equipment user, from the equipment repairer, or from various other sources. Each event variable may be a categorical variable.

At 1004, the service computing device may perform one-hot encoding to encode each event variable as a one-hot-coded vector, where the length of the vector is equal to the number of unique events in the data corpus. Once encoded, for each data point, the event variables may include a sequence of one-hot coded vectors.

At 1006, the service computing device may perform learnable dimension reduction. For instance, in the example of FIG. 10A, there may be no sequential dependency between the received event variables. When the event data are independent of each other, it is not necessary to perform learnable sequential feature extraction. During dimension reduction, the high-dimensional and sparse one-hot coded vectors are mapped on to a low-dimensional and continuous space using a learnable dimension reduction method. An example of the learnable dimension reduction method may include use of an embedding matrix, the weights of which are learned during the model training process. Thus, the result of the dimension reduction method may be a plurality of low-dimensional dense vectors. Because there is no sequential dependency between the events, the results of the learnable dimension reduction method may be used directly as the features.

Figure 10B:
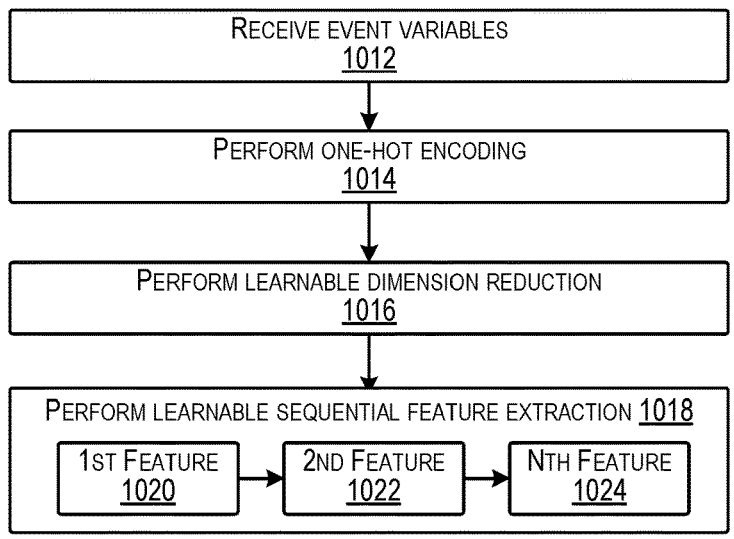
FIG. 10B is a flow diagram illustrating an example process for preliminary extraction of features from event data according to some implementations.

FIG. 10B is a flow diagram illustrating an example process 1010 for preliminary extraction of features from event data according to some implementations. In this example, the event data may have sequential dependency on each other.

At 1012, the service computing device may receive event variables. For example, the event variables may be received from the equipment, from a system associated with the equipment, from the equipment user, from the equipment repairer, or from various other sources. Each event variable may be a categorical variable.

At 1014, the service computing device may perform one-hot encoding to encode each event variable as a one-hot-coded vector, where the length of the vector is equal to the number of unique events in the data corpus. Once encoded, for each data point, the event variables are a sequence of one-hot encoded vectors.

At 1016, the service computing device may perform learnable dimension reduction. For instance, the high-dimensional and sparse one-hot coded vectors are mapped on to a low-dimensional and continuous space using a learnable dimension reduction method. An example of the learnable dimension reduction method may include the use of an embedding matrix, the weights of which are learned during the model training process. Thus, the result of the dimension reduction method is a sequence of low-dimensional dense vectors.

At 1018, the service computing device may perform learnable sequential feature extraction. For example, the service computing device may perform sequential feature extraction in a manner similar to that discussed above with respect to FIG. 3. Accordingly, when there is sequential dependency between the event variables, a sequential feature extraction method may be used to extract features, where the left most vector corresponding to a first feature 1020 represents the first event in the sequence, a second vector corresponding to a second feature 1022 represents a second event in the sequence, and the right most vector corresponding to an Nth feature 1024 represents the latest event in the sequence.

Figure 11A:
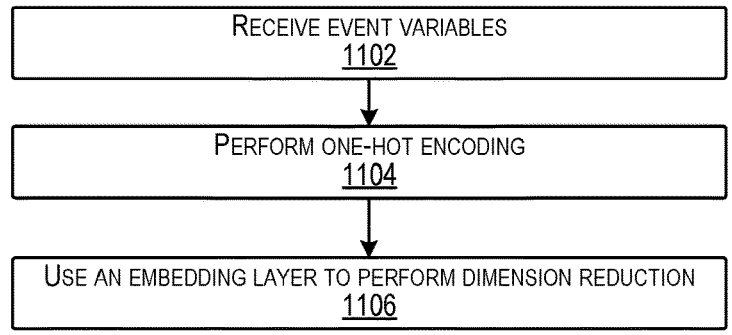
FIG. 11A is a flow diagram illustrating an example process for preliminary extraction of features from event data according to some implementations.

FIG. 11A is a flow diagram illustrating an example process 1100 for preliminary extraction of features from event data according to some implementations. The process 1100 of FIG. 11A may be employed when there is no sequential dependency between events, e.g., the events are independent of each other.

At 1102, the service computing device may receive event variables. For example, the event variables may be received from the equipment, from a system associated with the equipment, from the equipment user, from the equipment repairer, or from various other sources. Each event variable may be a categorical variable.

At 1104, the service computing device may perform one-hot encoding to encode each event variable as a one-hot-coded vector, where the length of the vector is equal to the number of unique events in the data corpus. Once encoded, for each data point, the event variables may include a sequence of one-hot coded vectors.

At 1106, the service computing device may use an embedding layer to perform dimension reduction. For instance, as in the case of FIG. 10A discussed above, there may be no sequential dependency between the received event variables. During dimension reduction, the high-dimensional and sparse one-hot coded vectors are mapped on to a low-dimensional and continuous space using an embedding matrix, the weights of which are learned during the model training process. Thus, the result of the dimension reduction method may be a plurality of low-dimensional dense vectors. Because there is no sequential dependency between the events, the results of the dimension reduction may be used directly as the features.

Figure 11B:
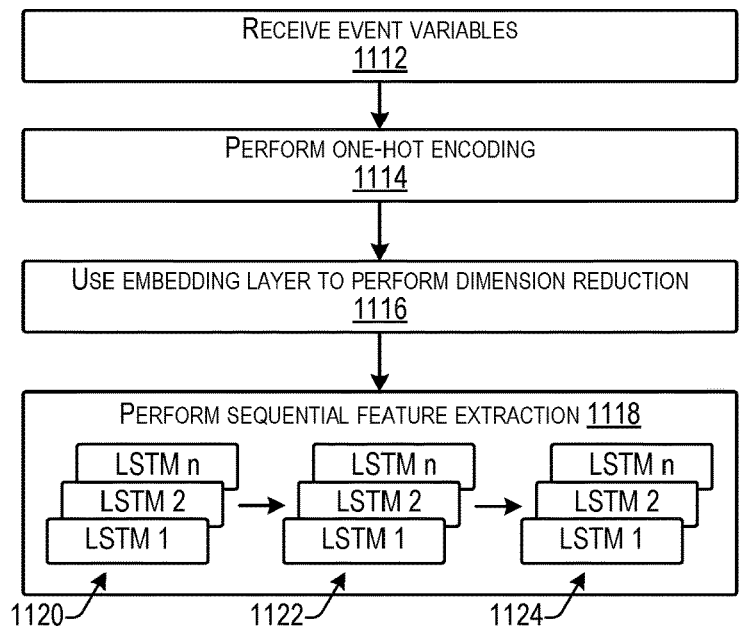
FIG. 11B is a flow diagram illustrating an example process for preliminary extraction of features from event data according to some implementations.

FIG. 11B is a flow diagram illustrating an example process 1110 for preliminary extraction of features from event data according to some implementations. In this example, the event data may have sequential dependency on each other.

At 1112, the service computing device may receive event variables. For example, the event variables may be received from the equipment, from a system associated with the equipment, from the equipment user, from the equipment repairer, or from various other sources. Each event variable may be a categorical variable.

At 1114, the service computing device may perform one-hot encoding to encode each event variable as a one-hot-coded vector, where the length of the vector is equal to the number of unique events in the data corpus. Once encoded, for each data point, the event variables are a sequence of one-hot encoded vectors.

At 1116, the service computing device may use an embedding layer to perform dimension reduction. During dimension reduction, the high-dimensional and sparse one-hot coded vectors are mapped on to a low-dimensional and continuous space using an embedding matrix, the weights of which are learned during the model training process. Thus, the result of the dimension reduction method may be a plurality of low-dimensional dense vectors.

At 1118, the service computing device may perform sequential feature extraction using LSTM units. For example, the service computing device may perform sequential feature extraction in a manner similar to that discussed above with respect to FIG. 4. Accordingly, when there is sequential dependency between the event variables, a sequential feature extraction method may be used to extract features. For instance, an LSTM unit may be applied to each vector 1 to N where a relevant feature is extracted from each vector. Thus, the feature extraction process may progress from the first vector on the left, as indicated at 1120, representing a first event in a sequence, to the next vector, as indicated at 1122, representing the second event in the sequence, to the Nth vector on the right, as indicated at 1124, representing the latest event in the sequence. The same LSTM unit(s) extract(s) features from each vector, and there can be multiple such LSTM units, e.g., LSTM 1, LSTM 1, . . . , LSTM n, as illustrated in this example, for extracting features from each vector.

In a series of events, not all events are important with respect to the comments and equipment information. Thus, based on the comments, equipment information (e.g., attributes, usage) features from only important events should be considered. A mechanism to model event importance is described additionally below.

Figure 12:
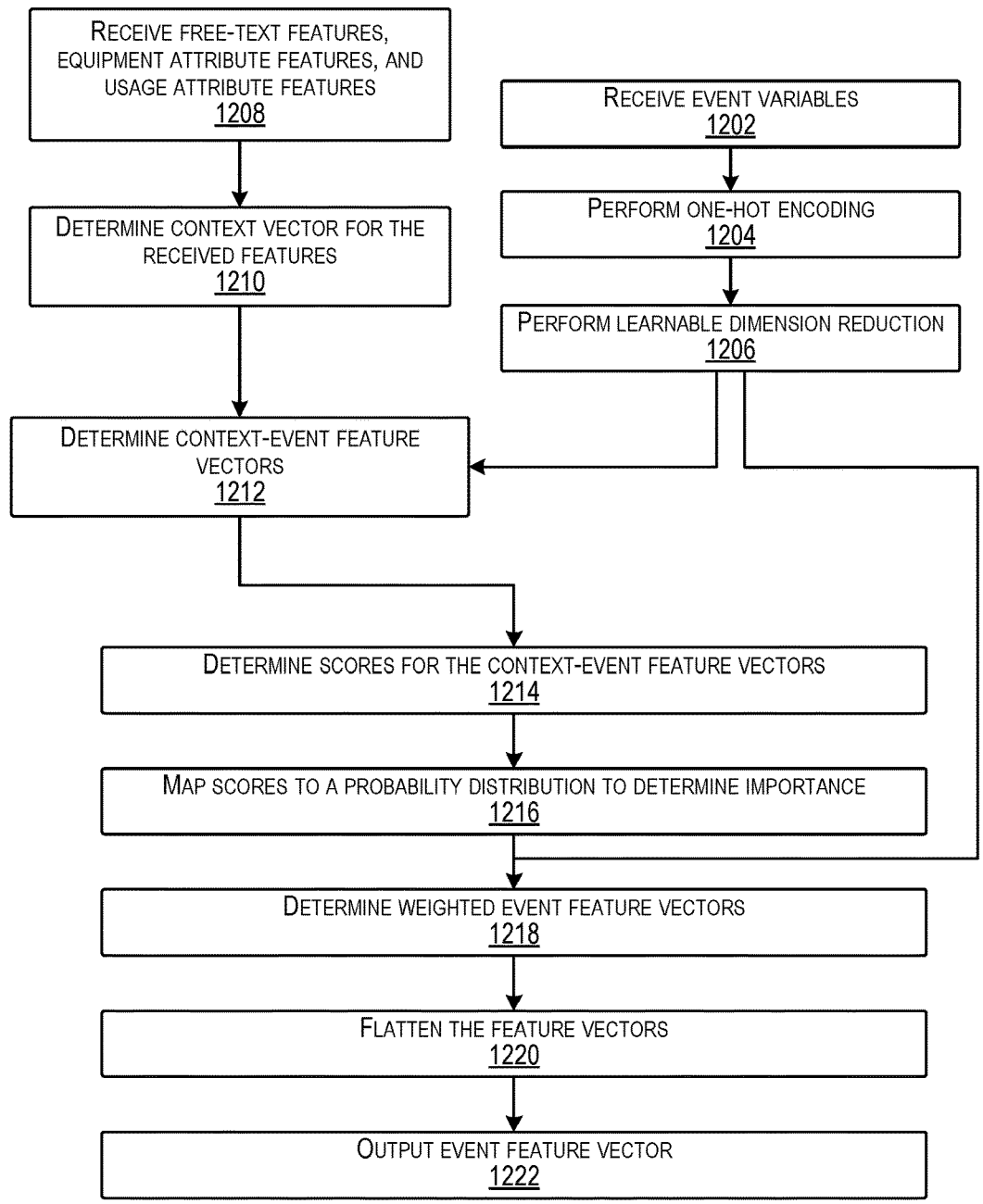
FIG. 12 is a flow diagram illustrating an example process for importance modeling of features extracted from event data according to some implementations.

FIG. 12 is a flow diagram illustrating an example process 1200 for importance modeling of features extracted from event data according to some implementations. In this example, there is no sequential dependency between the event variables. As mentioned above, not all events are important for a particular repair. Consequently, this example models the importance of each event and weights the relevant events higher.

1202-1206 may correspond to blocks 1002-1006 of FIG. 10A.

At 1208, the service computing device may determine or otherwise receive the features extracted from free-text comments, equipment attributes, and usage variables as discussed above, e.g., with respect to FIGS. 3-7.

At 1210, the service computing device may concatenate or otherwise combine the features extracted from the free-text comments, equipment attributes, and usage variables. This concatenated vector represents a context vector of prior information.

At 1212, the service computing device may concatenate or otherwise combine the context vector with the respective feature vector determined from each respective event to generate a plurality of context-event feature vectors.

At 1214, the service computing device may process each context-event feature vector to assign a respective score. For example, each context-event feature vector may be passed through a nonlinear function to determine a respective score for the respective context-event feature vector. One example of a suitable nonlinear function may include a hyperbolic tangent (tan h) function. For instance, if the tan h function is used, then each context-event feature vector is converted into a score ranging from −1 to 1. Accordingly, the result of the operation at 1214 may be a plurality of scores ranging from −1 to 1.

At 1216, the service computing device may map the plurality of scores to a probability distribution using a learnable function to determine an importance of the respective context-event feature vectors. One example of a suitable learnable function to map the scores to a probability distribution is a softmax function. The softmax function is a generalization of the logistic function that reduces a K-dimensional vector z of arbitrary real values to a K-dimensional vector σ(z) of real values, where each entry is normalized to a value between 0 and 1, and all the entries add up to 1. The number of output classes of the function may be equal to the number of events in the sequence. The values obtained from the function may correspond to the relative importance of each event. Accordingly, in this example, the importance values may range between 0 and 1, although various other scoring and weighting techniques will be apparent to those of skill in the art having the benefit of the disclosure herein.

At 1218, the service computing device may multiply the respective importance value determined for each context-event feature vector with the respective event feature vector, thereby generating a plurality of weighted event feature vectors. Because the importance value is multiplied with the respective event feature vector forming the weighted event feature vector, if an event is not important, i.e., importance value is 0, then the event feature vector is ultimately reduced to 0 and hence does not contribute any information further down in the neural network.

At 1220, the importance weighted event feature vectors may be flattened by converting the weighted feature vectors to 1-D feature vector, e.g., a single feature vector.

At 1222, the event feature vector is output for use with a machine learning model, such as for training the model during a training stage or for use as an input during a model application stage.

Figure 13:
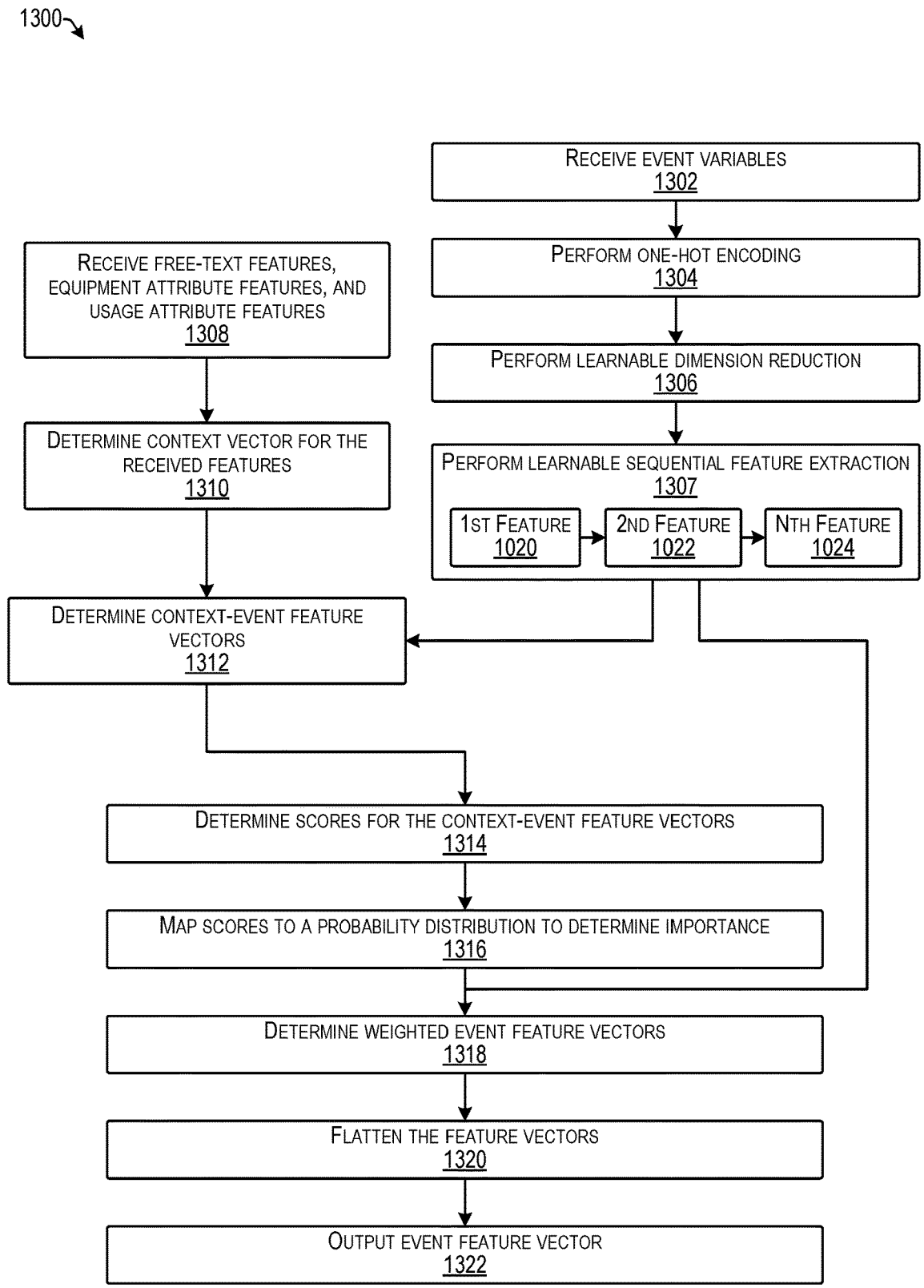
FIG. 13 is a flow diagram illustrating an example process for importance modeling of features extracted from event data according to some implementations.

FIG. 13 is a flow diagram illustrating an example process 1300 for importance modeling of features extracted from event data according to some implementations. In this example, there is a sequential dependency between the event variables. As mentioned above, not all events are important for a particular repair. Consequently, this example models the importance of each event and weights the relevant events higher.

1302-1307 may correspond to blocks 1012-1018 of FIG. 10B.

At 1308, the service computing device may determine or otherwise receive the features extracted from free-text comments, equipment attributes, and usage variables as discussed above, e.g., with respect to FIGS. 3-7.

At 1310, the service computing device may concatenate or otherwise combine the features extracted from the free-text comments, equipment attributes, and usage variables. This concatenated vector represents a context vector of prior information.

At 1312, the service computing device may concatenate or otherwise combine the context vector with the respective feature vector determined from each respective event to generate a plurality of context-event feature vectors.

At 1314, the service computing device may process each context-event feature vector to assign a respective score. For example, each context-event feature vector may be passed through a nonlinear function to determine a respective score for the respective context-event feature vector. One example of a suitable nonlinear function may include a hyperbolic tangent (tan h) function. For instance, if the tan h function is used, then each context-event feature vector is converted into a score ranging from −1 to 1. Accordingly, the result of the operation at 1314 may be a plurality of scores ranging from −1 to 1.

At 1316, the service computing device may map the plurality of scores to a probability distribution using a learnable function to determine an importance of the respective context-event feature vectors. One example of a suitable learnable function to map the scores to a probability distribution is a softmax function. The softmax function is a generalization of the logistic function that reduces a K-dimensional vector z of arbitrary real values to a K-dimensional vector σ(z) of real values, where each entry is normalized to a value between 0 and 1, and all the entries add up to 1. The number of output classes of the function may be equal to the number of events in the sequence. The values obtained from the function may correspond to the relative importance of each event. Accordingly, in this example, the importance values may range between 0 and 1, although various other scoring and weighting techniques will be apparent to those of skill in the art having the benefit of the disclosure herein.

At 1318, the service computing device may multiply the respective importance value determined for each context-event feature vector with the respective event feature vector, thereby generating a plurality of weighted event feature vectors. Because the importance value is multiplied with the respective event feature vector forming the weighted event feature vector, if an event is not important, i.e., importance value is 0, then the event feature vector is ultimately reduced to 0 and hence does not contribute any information further down in the neural network.

At 1320, the importance weighted event feature vectors may be flattened by converting the weighted feature vectors to 1-D feature vector, e.g., a single feature vector.

At 1322, the event feature vector is output for use with a machine learning model, such as for training the model during a training stage or for use as an input during a model application stage.

Figure 14:
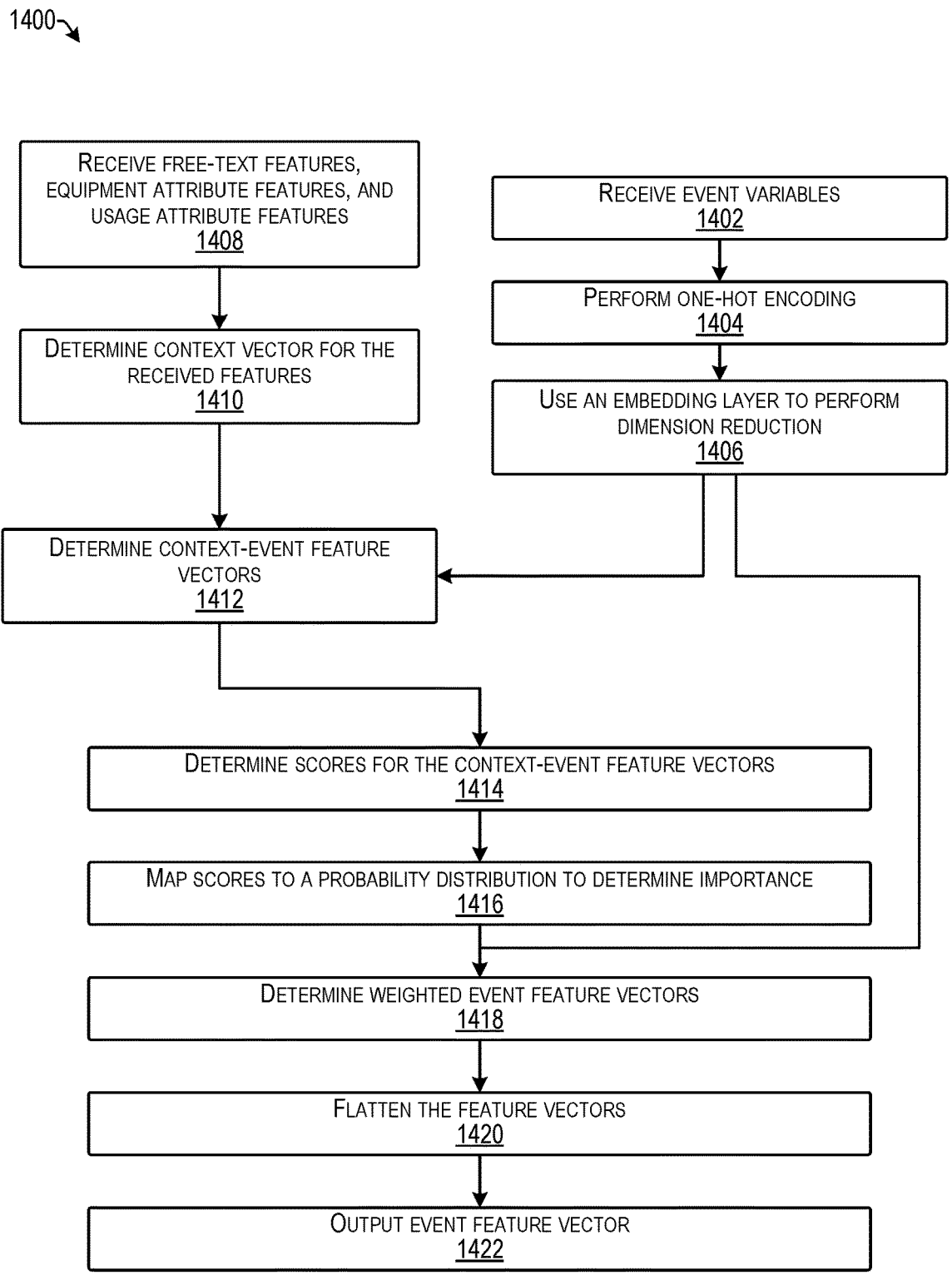
FIG. 14 is a flow diagram illustrating an example process for importance modeling of features extracted from event data according to some implementations.

FIG. 14 is a flow diagram illustrating an example process 1400 for importance modeling of features extracted from event data according to some implementations. In this example, there is no sequential dependency between the event variables.

1402-1406 may correspond to blocks 1102-1106 of FIG. 11A.

1408-1422 may correspond to blocks 1208-1222 discussed above with respect to FIG. 12.

Figure 15:
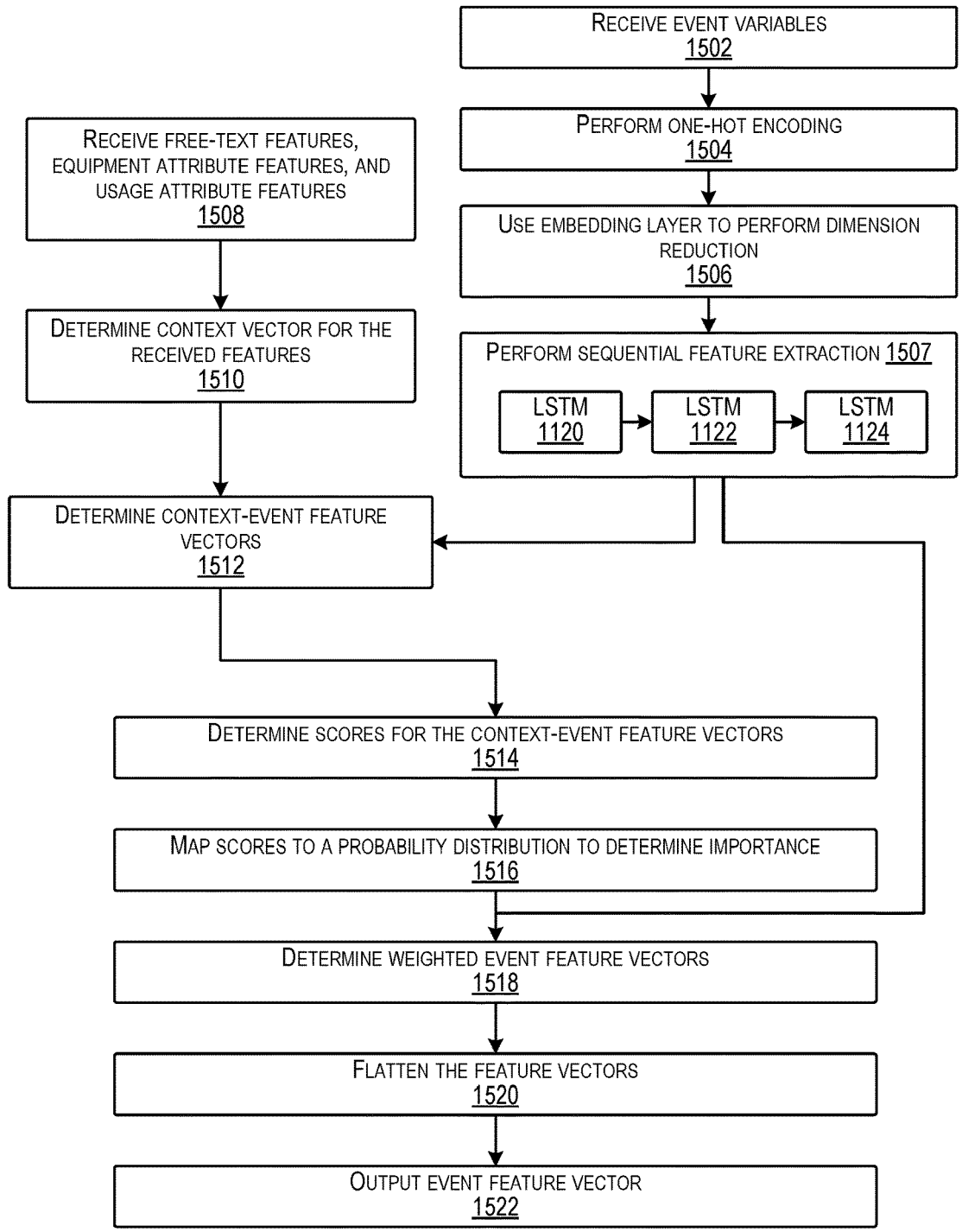
FIG. 15 is a flow diagram illustrating an example process for importance modeling of features extracted from event data according to some implementations.

FIG. 15 is a flow diagram illustrating an example process 1500 for importance modeling of features extracted from event data according to some implementations. In this example, there is a sequential dependency between the event variables.

1502-1507 may correspond to blocks 1112-1118 of FIG. 11B.

1508-1522 may correspond to blocks 1308-1322 discussed above with respect to FIG. 13.

The features extracted from the free-text comments, the equipment attributes, the usage data, the sensor data, and the event data may be combined/concatenated to form an information fusion layer. The combined information may then be passed downstream to multiple fully connected neural networks. The output of the final fully connected neural network is one or more repair actions having a highest probability of success.

Figure 16:
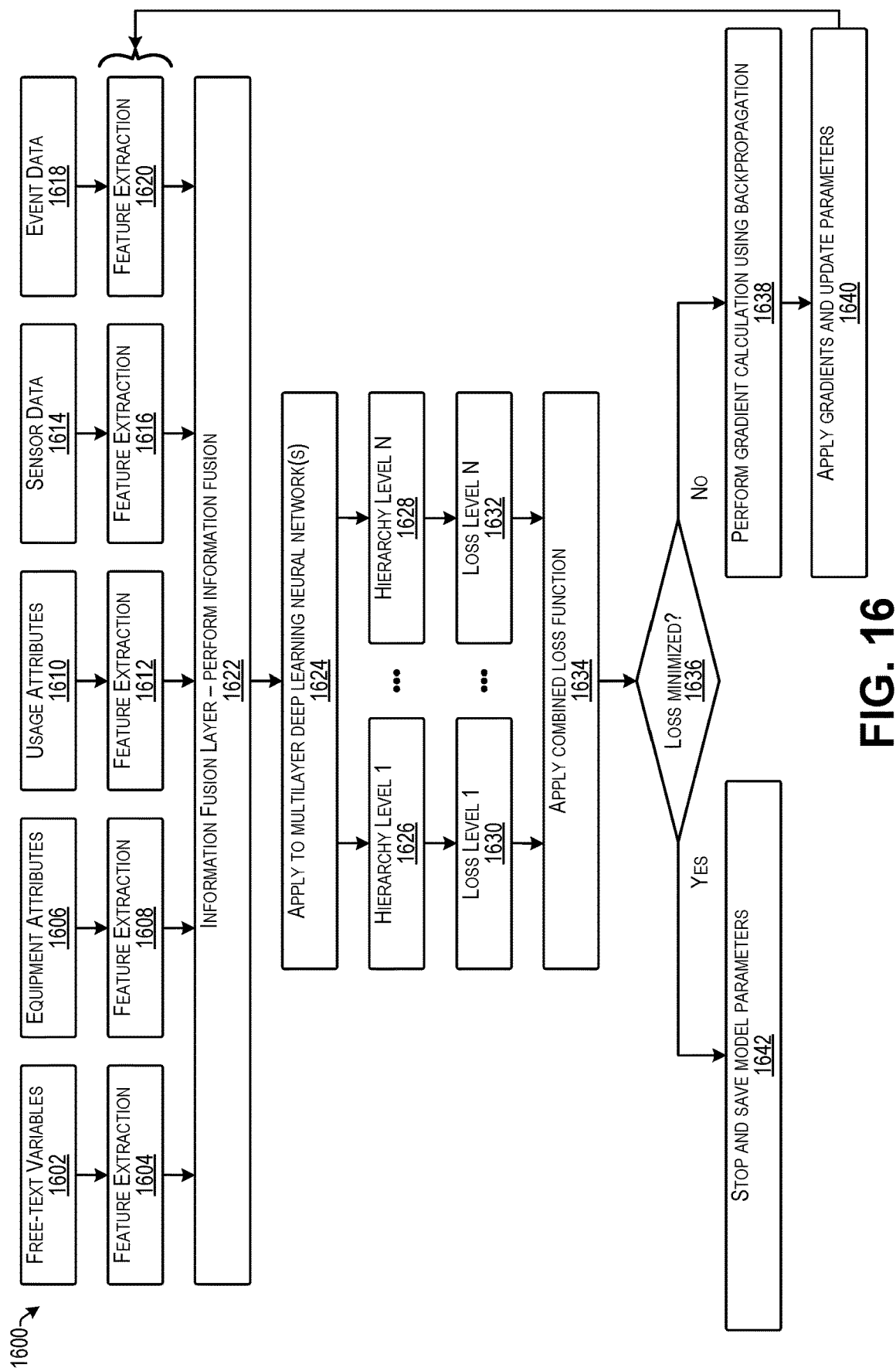
FIG. 16 is a flow diagram illustrating an example process for model building according to some implementations.

FIG. 16 is a flow diagram illustrating an example process 1600 for model building according to some implementations. For example, the model building and application program may be executed to build one or more deep learning neural network models that may be configured to output consistent and accurate structured repair instructions. In some cases, as discussed below with respect to FIG. 18, the output may include an indication of a probability of success if the instructed repair is applied.

In some implementations, the repair instruction models herein may be modeled as a classification task where each class represents a repair. Each repair may be represented as a hierarchy of systems and finally an action, thus a repair is a location (represented by a hierarchy of systems) and a repair action. The number of classes for various different repair actions may be very high. Conventionally, such hierarchical classes have been handled by building hierarchical classification models, where the system level class acts as a prior for the sub-system level class. However, the conventional technique leads to two issues: (1) the number of models is very high and may be difficult to manageable, and (2) the outputs may be inconsistent because of error propagation.

On the other hand, implementations herein may model the repair action determination problem not only as a classification problem, but also as a multi-task classification problem. In this case, each task may represent each level of the repair hierarchy. As an example, suppose that "sub-system level 1", "sub-system level 2" and "action" are three tasks. The output from the neural network, e.g., the repair instruction may be represented as a tuple (sub system level 1, sub system level 2, . . . , sub system level n, action). Model training of the neural networks in some examples herein may involve the backpropagation algorithm and an optimization algorithm, such as the naïve gradient descent or its variants like stochastic gradient descent, stochastic gradient descent with nesterov momentum, Adam optimization algorithm, Adagrad, RMSProp, or the like.

The backpropagation algorithm calculates the gradients with respect to each learnable variable in the neural network using a loss function. Generally, loss function in the case of a classification technique is a cross-entropy loss function. In the case of the repair action determination herein, as it is modeled as a multi-task classification problem, first the cross-entropy loss of each level in the repair hierarchy is calculated, and finally all the cross-entropy losses are added to form the joint loss function. The joint function is then used to calculate the gradients using the backpropagation algorithm. The optimization function is used to minimize the joint loss function where, in each iteration, the calculated gradients are used to update the parameters of the network. Thus, in the case of determining a repair action, the optimization algorithm minimizes the losses at a level of the repair hierarchy simultaneously. This leads to a single deep learning model herein learning or otherwise being trained to perform multiple tasks (in this case predict each level of a repair hierarchy). Further, there is no error propagation from top to bottom in the hierarchy as the losses are independent of each other. This training/model building methodology results in a single model being capable of handling a large number of repair classes to determine appropriate repairs.

In the example of FIG. 16, the process may be executed by the service computing device by execution of the model building and application program.

At 1602, the service computing device accesses or otherwise receives free-text variables. For example, the free-text variables may be received from any of the sources discussed above.

At 1604, the service computing device may extract features from the received free-text variables, e.g., as discussed above with respect to FIGS. 3-4.

At 1606, the service computing device accesses or otherwise receives equipment attributes. For example, the equipment attributes may be received from any of the sources discussed above.

At 1608, the service computing device may extract features from the received equipment attributes, e.g., as discussed above with respect to FIGS. 5-6.

At 1610, the service computing device accesses or otherwise receives usage attributes. For example, the usage attributes may be received from any of the sources discussed above.

At 1612, the service computing device may extract features from the received usage attributes, e.g., as discussed above with respect to FIG. 7.

At 1614, the service computing device accesses or otherwise receives sensor data. For example, the sensor data may be received from any of the sources discussed above.

At 1616, the service computing device may extract features from the received sensor data, e.g., as discussed above with respect to FIGS. 8-9.

At 1618, the service computing device accesses or otherwise receives event data. For example, the event data may be received from any of the sources discussed above.

At 1620, the service computing device may extract features from the received event data, e.g., as discussed above with respect to FIGS. 10A-15.

At 1622, the service computing device may form an information fusion layer by concatenating or otherwise combining the features extracted from the free-text comments, the equipment attributes, the usage data, the sensor data, and the event data to form the information fusion layer. The combined information may then be passed downstream to one or more fully connected neural networks.

At 1624, the service computing device may apply the combined information to one or more deep learning neural networks. For example, the combined information may be used to train a deep learning neural network or, in an application stage, the combined information may be used an input to the deep learning neural network.

At 1626 through 1628, the service computing device may represent each repair action within a hierarchy of systems and corresponding repair actions. Accordingly, a repair action may be a location within the hierarchy of systems and the corresponding actions. The hierarchy of systems and the corresponding repair actions for a free text variable, equipment attribute, usage attribute, sensor data and event data may be obtained from the historical repair data discussed above, e.g., with respect to FIG. 1. As the repair action recommendation is modeled as a classification problem, the hierarchical levels obtained from historical repairs may be the target variables that are used to build the model. For example, Hierarchy Level 1 at 1626 may be represented by a system, whereas the Hierarchy Level N at 1628 may be represented as a specific part in that system. As an example, suppose that Hierarchy Level 1 represents a car engine, while a Hierarchy Level 3 (not shown in FIG. 16) may represent a carburetor of the car engine. The corresponding repair action may also be part of the hierarchy. An example of a hierarchical relationship in repair may be a car engine→carburetor→replace, where the car engine is hierarchical level 1, the carburetor is hierarchical level 2, and "replace" (which is a repair action) is hierarchical level 3. The hierarchical relationship corresponds to the repair action, e.g., "replace carburetor within car engine".

At 1630 through 1632, the service computing device may apply a loss function, such as a backpropagation algorithm. For example, the backpropagation algorithm may be used to calculate the gradients with respect to each learnable variable in the neural network using a loss function. In some example, the loss function may be a cross-entropy loss function. In the case of the repair action determination herein, it is modeled as a multi-task classification problem.

At 1634, the service computing device may apply a combined loss function. For example, following calculation of the cross-entropy loss of each level in the repair hierarchy at 1630-1632, the service computing device may add the cross-entropy losses together to form a joint or otherwise combined loss function. The combined loss function may then be used to calculate the gradients using the backpropagation algorithm. If the combined loss is represented by $\mathcal{L}$ and a parameter of the model is represented by x, then the gradient of the loss with respect to the model parameter, $$\frac{\partial \mathcal{L}}{\partial x}$$

is computed. Using the computed gradient, the optimization algorithm updates the model parameter x, for example, using the update rule $$x = x - \alpha \frac{\partial \mathcal{L}}{\partial x},$$

where α is the learning rate. The update rule varies based on the optimization algorithm being used. An example of the optimization algorithm is Stochastic Gradient and its variants. The combined loss function computation, gradient computation, model parameter update continues until convergence on the combined loss where the loss is being minimized.

At 1636, the service computing device may determine whether the calculated loss is minimized. If so, the process goes to 1638. If not, the process goes to 1640.

At 1638, if the loss is not yet minimized, the service computing device may perform gradient calculation using the backpropagation algorithm. For example, the combined loss function may be used to calculate the gradients using the backpropagation algorithm.

At 1640, the service computing device applies the gradients calculated in 1640 and updates the model parameters. The process then returns to blocks 1604, 1608, 1612, 1616 and 1620 to apply the updated model parameters. Accordingly, the process may perform one or more optimization iterations to minimize the combined loss function where, in each iteration, the calculated gradients are used to update the parameters of the neural network.

At 1642, if the loss is minimized, the process ends and the model parameters are saved. For example, the process 1600 may continue until convergence on the combined loss where the loss is minimized.

Figure 17:
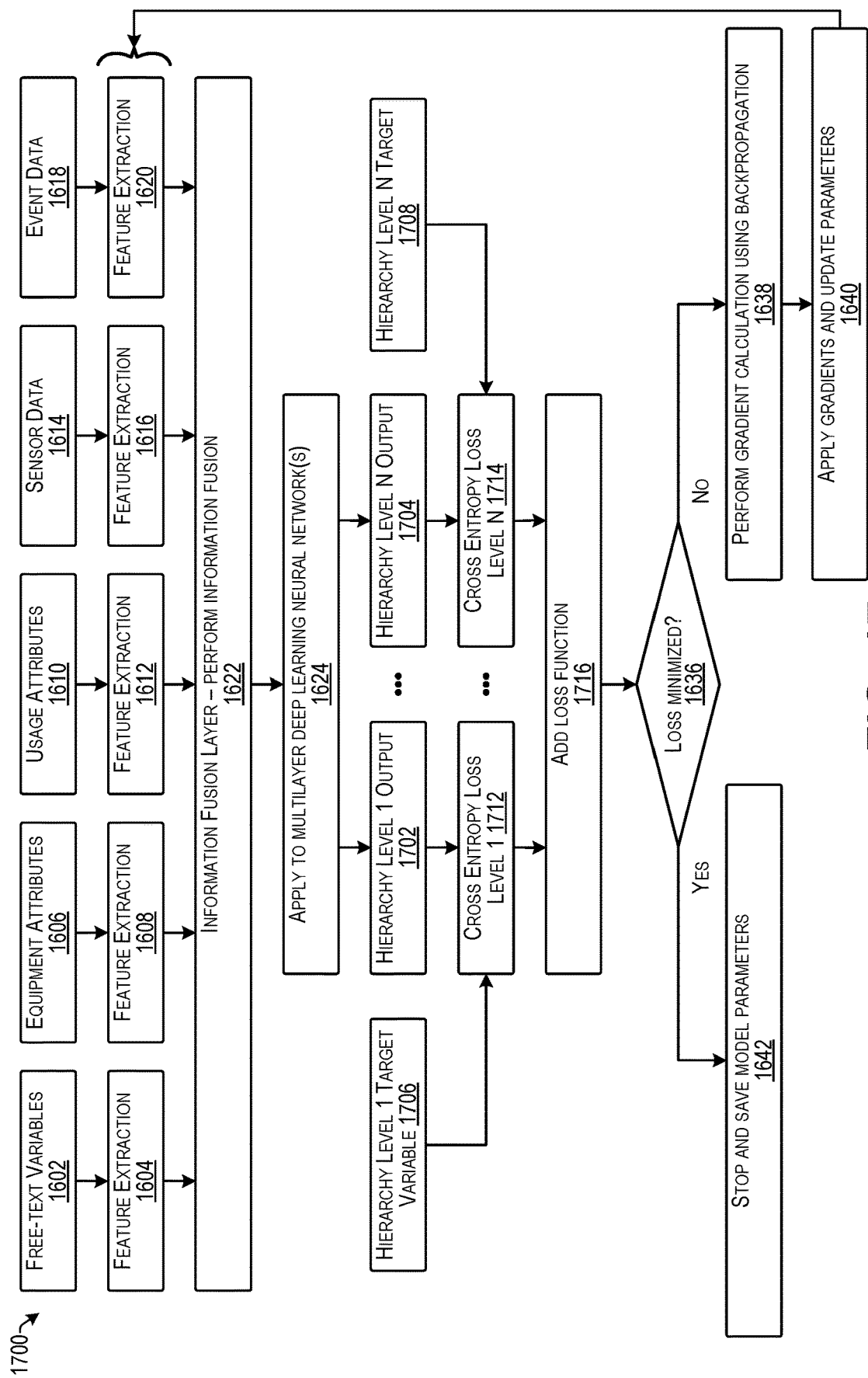
FIG. 17 is a flow diagram illustrating an example process for model building according to some implementations.

FIG. 17 is a flow diagram illustrating an example process 1700 for model building according to some implementations. For example, the model building and application program may be executed by the service computing device to build a deep learning neural network model that may be configured to output consistent and accurate structured repair instructions. In some cases, as discussed below with respect to FIG. 18, the output may include an indication of a probability of success if the instructed repair is applied.

In FIG. 17, blocks 1602-1624 are the same as or similar to blocks 1602-1624 described above with respect to FIG. 16.

At 1702 through 1704, the service computing device may represent each repair action within a hierarchy of systems and a corresponding action. Accordingly, a repair action may be a location within the hierarchy of systems and the corresponding action. The hierarchy of systems and the corresponding repair action for a free text variable, equipment attribute, usage attribute, sensor data and event data may be obtained from the historical repair data. As the repair action recommendation is modeled as a classification problem, the hierarchical levels obtained from historical repairs may be the target variables that are used to build the model. For instance, a hierarchy level target variable may correspond to each hierarchy level output 1702-1704. In this example, a hierarchy level 1 target variable 1706, may correspond to hierarchy level 1 output 1702, a hierarchy level N target variable 1708 may correspond to hierarchy level N output, and so forth.

At 1712-1714, the service computing device may determine the cross entropy loss for each hierarchy level output 1702-1704 based on the corresponding hierarchy level 1 target variable 1706-1708. For example, for each hierarchy level a cross-entropy loss function is computed using the output of the model for each hierarchy level and the corresponding target variable 1706-1708.

At 1716, using the computed cross entropy loss functions of each hierarchy level 1-N, the service computing device may calculate the combined loss function by adding the computed loss functions together to determine the combined loss. As discussed above, if the combined loss is represented by $\mathcal{L}$ and a parameter of the model is represented by x, then the gradient of the loss with respect to the model parameter, $$\frac{\partial \mathcal{L}}{\partial x}$$

is computed. Using the computed gradient, the optimization algorithm updates the model parameter x, for example, using the update rule $$x = x - \alpha \frac{\partial \mathcal{L}}{\partial x},$$

where α is the learning rate. The update rule varies based on the optimization algorithm being used. An example of the optimization algorithm is Stochastic Gradient and its variants. The combined loss function computation, gradient computation, model parameter update continues until convergence on the combined loss where the loss is being minimized.

In FIG. 17, blocks 1634-1642 are the same as or similar to blocks 1634-1642 described above with respect to FIG. 16.

Figure 18:
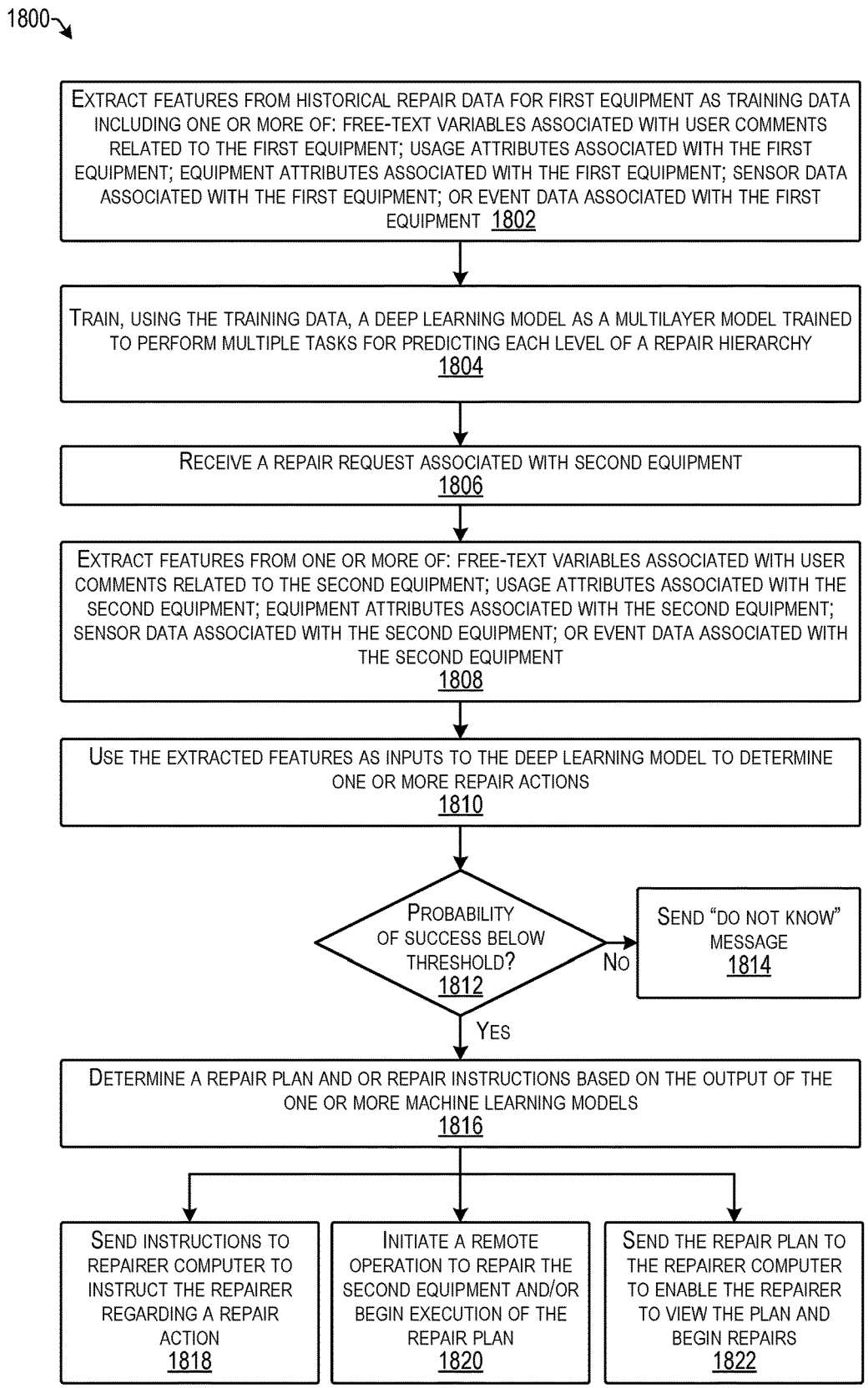
FIG. 18 is a flow diagram illustrating an example process for determining and executing a repair action according to some implementations.

FIG. 18 is a flow diagram illustrating an example process 1800 for determining and executing a repair action according to some implementations. In some examples, the process 1800 may be performed by one or more processors of the service computing device 102 by executing the repair management program 126 which may invoke one or more of the data preparation program 128, the relevant data extraction program 130, the feature extraction program 132, the model building and application program 134, and the repair plan execution program 136 for performing some of the operations described in the process 1800.

Accordingly, some examples herein include a system for determining a repair action by training and using a deep learning model based on historical repairs along with the associated data. The functions provided by the system may include, but are not limited to determining a course of repair actions when the equipment fails; reducing diagnosis and repair time; increasing the availability of the equipment; and reducing the number of repair mistakes. Implementations herein may be used as a standalone solution or may be integrated with existing systems that provide other functionalities for maintenance management and optimization.

At 1802, the computing device may train a deep learning model using historical repair data for equipment as training data. Details of the training are discussed above with respect to FIGS. 1-16.

At 1804, the computing device may receive a repair request associated with the equipment. For example, during the model application stage discussed above with respect to FIG. 2, the computing device may receive a repair request from one of the client computing devices discussed above with respect to FIG. 1.

At 1806, the computing device may extract features from one or more of: free-text variables associated with user comments related to the equipment; usage attributes associated with the equipment; equipment attributes associated with the equipment; sensor data associated with the equipment; or event data associated with the equipment.

At 1810, the computing device may use the extracted features as inputs to the trained deep learning model to determine one or more repair actions.

At 1812, the computing device may determine whether a probability of success of the one or more repair actions is below a threshold probability. For instance, in some cases, if the likelihood of success is low, a repair action may not be provided in response to the repair request. According, if the probability of success does not exceed the threshold, the process may go to block 1814; alternatively, if the probability of success does exceed the threshold the process may go to block 1816.

At 1814, if the probability of success does not exceed the cost, the computing device may send an indication of a "do not know" message indicating that the repair request did not provide enough information for a repair action to be determined.

At 1816, if the probability of success does exceed the cost, the computing device may determine a repair plan and or repair instructions based on the output of the one or more machine learning models.

At 1818, the computing device may send an instruction to a repairer computer to instruct the repairer regarding performing a repair action to the equipment.

At 1820, the computing device may the initiate a remote operation to repair the equipment and/or may begin execution of the repair plan.

At 1822, the computing device may send the repair plan to the repairer computer to enable the repairer to view the plan and begin repairs.

The example processes described herein are only examples of processes provided for discussion purposes. Numerous other variations will be apparent to those of skill in the art in light of the disclosure herein. Further, while the disclosure herein sets forth several examples of suitable systems, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as programs stored on computer-readable media, and executed by the processor(s) herein. Generally, programs include routines, modules, objects, components, data structures, executable code, etc., for performing particular tasks or implementing particular abstract data types. These programs, and the like, may be executed as native code or may be downloaded and executed, such as in a virtual machine or other just-in-time compilation execution environment. Typically, the functionality of the programs may be combined or distributed as desired in various implementations. An implementation of these programs and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A system comprising:
one or more processors; and
one or more non-transitory computer-readable media maintaining executable instructions, which, when executed by the one or more processors, configure the one or more processors to perform operations including:
receiving historical repair data;
extracting features from the historical repair data as training data;
determining, from the historical repair data, a repair hierarchy including a plurality of repair levels which includes one or more repair actions as one of the repair levels;
training a single machine learning model for determining the one or more repair actions, the single machine learning model trained to perform multiple tasks for predicting values for individual repair levels of the repair hierarchy, the single machine learning model trained by tuning parameters of the single machine learning model using the training data, wherein the training the single machine learning model includes:
determining, for each task of the multiple tasks that correspond to each of the individual repair levels of the repair hierarchy, a respective loss within the single machine learning model for each individual repair level of the repair hierarchy, wherein the respective loss indicates an error within the single machine learning model;
combining the respective losses in the single machine learning model determined for each of the individual repair levels of the repair hierarchy to determine a joint loss function; and
optimizing the joint loss function during training of the single machine learning model to update the parameters of the single machine learning model to perform predictions at each of the individual repair levels of the repair hierarchy.

2. The system as recited in claim 1, wherein the single machine learning model is configured to:
determine a repair plan based on the one or more repair actions and a respective probability of success determined for each repair action of the one or more repair actions; and
perform at least one of:
sending an order for a part for a repair;
sending a communication to assign labor to perform the repair;
sending a communication to schedule a repair time for the repair; or
remotely initiating a procedure on equipment to be repaired to effectuate, at least partially, the repair.

3. The system as recited in claim 1, wherein:
the historical repair data is for equipment, and the plurality of repair levels in the repair hierarchy includes:

one or more systems of the equipment as a first repair level of the repair hierarchy on which the single machine learning model performs a prediction;
one or more subsystems of the one or more systems of the equipment as second repair level of the repair hierarchy on which the single machine learning model performs a prediction; and
the one or more repair actions to perform on the equipment as a third repair level of the repair hierarchy on which the single machine learning model performs a prediction.

4. The system as recited in claim 1, the operations further comprising, during the training of the single machine learning model, employing a backpropagation algorithm to calculate gradients with respect to each learnable variable in the single machine learning model using the joint loss function.

5. The system as recited in claim 1, wherein optimizing the joint loss function during the training of the single machine learning model is conducted by minimizing the joint loss function to minimize, concurrently, the respective losses in the single machine learning model that correspond to the individual repair levels of the repair hierarchy during the training of the single machine learning model.

6. The system as recited in claim 1, wherein the joint loss function is determined based on a sum of a cross entropy loss of each repair level of the repair hierarchy.

7. A method for building a machine learning model for determining one or more repair actions corresponding to a repair request, the method comprising:
receiving, by one or more processors, historical repair data;
extracting features from the historical repair data as training data;
determining, from the historical repair data, a repair hierarchy including a plurality of repair levels which includes the one or more repair actions as one of the repair levels; and
training a single machine learning model as the machine learning model for determining the one or more repair actions, the single machine learning model trained to perform multiple tasks for predicting values for individual repair levels of the repair hierarchy, the single machine learning model trained by tuning parameters of the single machine learning model using the training data, wherein the training the single machine learning model includes:
determining, for each task of the multiple tasks that correspond to each of the individual repair levels of the repair hierarchy, a respective loss within the single machine learning model for each individual repair level of the repair hierarchy, wherein the respective loss indicates an error within the single machine learning model;
combining the respective losses in the single machine learning model determined for each of the individual repair levels of the repair hierarchy to determine a joint loss function; and
optimizing the joint loss function during training of the single machine learning model to update the parameters of the single machine learning model to perform predictions at each of the individual repair levels of the repair hierarchy.

8. The method as recited in claim 7, wherein the single machine learning model is configured to determine a repair plan based on the one or more repair actions and a respective probability of success determined for each repair action of the one or more repair actions.

9. The method as recited in claim 8, wherein the single machine learning model is configured to perform at least one of:
sending an order for a part for a repair;
sending a communication to assign labor to perform the repair;
sending a communication to schedule a repair time for the repair; or
remotely initiating a procedure on equipment to be repaired to effectuate, at least partially, the repair.

10. The method as recited in claim 7, further comprising, during the training of the single machine learning model, employing a backpropagation algorithm to calculate gradients with respect to each learnable variable in the single machine learning model using the joint loss function.

11. The method as recited in claim 7, wherein optimizing the joint loss function during the training of the single machine learning model is conducted by minimizing the joint loss function to minimize, concurrently, the respective losses in the single machine learning model that correspond to the individual repair levels of the repair hierarchy during the training of the single machine learning model.

12. The method as recited in claim 7, wherein the joint loss function is determined based on a sum of cross entropy loss of each repair level of the repair hierarchy.

13. One or more non-transitory computer-readable media storing instructions that, when executed by one or more processors, program the one or more processors to perform operations comprising:
receiving historical repair data;
extracting features from the historical repair data as training data;
determining, from the historical repair data, a repair hierarchy including a plurality of repair levels which includes one or more repair actions as one of the repair levels; and
training a single machine learning model for determining the one or more repair actions, the single machine learning model trained to perform multiple tasks for predicting values for individual repair levels of the repair hierarchy, the single machine learning model trained by tuning parameters of the single machine learning model using the training data, wherein the training the single machine learning model includes:
determining, for each task of the multiple tasks that correspond to each of the individual repair levels of the repair hierarchy, a respective loss within the single machine learning model for each individual repair level of the repair hierarchy, wherein the respective loss indicates an error within the single machine learning model;
combining the respective losses in the single machine learning model determined for each of the individual repair levels of the repair hierarchy to determine a joint loss function; and
optimizing the joint loss function during training of the single machine learning model to update the parameters of the single machine learning model to perform predictions at each of the individual repair levels of the repair hierarchy.

14. The one or more non-transitory computer-readable media as recited in claim 13, wherein the single machine learning model is configured to determine a repair plan based on the one or more repair actions and a respective probability of success determined for each repair action of the one or more repair actions.

15. The one or more non-transitory computer-readable media as recited in claim 14, wherein the single machine learning model is configured to perform at least one of:
- sending an order for a part for a repair;
- sending a communication to assign labor to perform the repair;
- sending a communication to schedule a repair time for the repair; or
- remotely initiating a procedure on equipment to be repaired to effectuate, at least partially, the repair.

16. The one or more non-transitory computer-readable media as recited in claim 13, further comprising, during the training of the single machine learning model, employing a backpropagation algorithm to calculate gradients with respect to each learnable variable in the single machine learning model using the joint loss function.

17. The one or more non-transitory computer-readable media as recited in claim 13, wherein optimizing the joint loss function during the training of the single machine learning model is conducted by minimizing the joint loss function to minimize, concurrently, the respective losses in the single machine learning model that correspond to the individual repair levels of the repair hierarchy during the training of the single machine learning model.

18. The one or more non-transitory computer-readable media as recited in claim 13, wherein the joint loss function is determined based on a sum of cross entropy loss of each repair level of the repair hierarchy.

19. The one or more non-transitory computer-readable media as recited in claim 13, wherein:
- the historical repair data is for equipment, and the plurality of repair levels in the repair hierarchy includes:
- one or more systems of the equipment as a first repair level of the repair hierarchy on which the single machine learning model performs a prediction;
- one or more subsystems of the one or more systems of the equipment as second repair level of the repair hierarchy on which the single machine learning model performs a prediction; and
- the one or more repair actions to perform on the equipment as a third repair level of the repair hierarchy on which the single machine learning model performs a prediction.

20. The method as recited in claim 7, wherein:
- the historical repair data is for equipment, and the plurality of repair levels in the repair hierarchy includes:
- one or more systems of the equipment as a first repair level of the repair hierarchy on which the single machine learning model performs a prediction;
- one or more subsystems of the one or more systems of the equipment as second repair level of the repair hierarchy on which the single machine learning model performs a prediction; and
- the one or more repair actions to perform on the equipment as a third repair level of the repair hierarchy on which the single machine learning model performs a prediction.

* * * * *